United States Patent [19]
Gilboa

[11] Patent Number: 5,853,327
[45] Date of Patent: Dec. 29, 1998

[54] COMPUTERIZED GAME BOARD

[75] Inventor: Pinhas Gilboa, Haifa, Israel

[73] Assignee: Super Dimension, Inc., Wilmington, Del.

[21] Appl. No.: 603,627

[22] Filed: Feb. 21, 1996

[51] Int. Cl.[6] .............................. A63F 9/22; G06F 15/44
[52] U.S. Cl. .......................... 463/39; 273/237; 273/238
[58] Field of Search .................................... 463/1, 36–37, 463/39, 30, 31, 35, 32, 9, 14, 15; 434/128, 307 R, 308, 322, 323; 273/236, 237, 238, 241, 242, 243, 460

[56] References Cited

U.S. PATENT DOCUMENTS

| | | | |
|---|---|---|---|
| Re. 33,662 | 8/1991 | Blair et al. .................................. | 463/39 |
| 4,341,385 | 7/1982 | Doyle et al. .............................. | 273/237 |
| 5,013,047 | 5/1991 | Schwab ..................................... | 273/238 |
| 5,082,286 | 1/1992 | Ryan et al. ................................ | 273/238 |
| 5,088,928 | 2/1992 | Chan ......................................... | 434/339 |
| 5,129,654 | 7/1992 | Bogner ..................................... | 273/238 |
| 5,188,368 | 2/1993 | Ryan ......................................... | 273/237 |
| 5,190,285 | 3/1993 | Levy et al. ............................... | 273/237 |
| 5,435,573 | 7/1995 | Oakford .................................... | 463/39 |

*Primary Examiner*—Jessica J. Harrison
*Assistant Examiner*—Mark A Sager
*Attorney, Agent, or Firm*—Ladas & Parry

[57] ABSTRACT

A combination computer game and board game including a game board, a plurality of toy figures selectably positionable by a player with respect to the game board and apparatus for automatically and non-discretely sensing the location of the toy figures relative to the game board and actuating an audio/visual display sequence in response thereto.

37 Claims, 23 Drawing Sheets

T1

T2

INPUT SIGNAL

AMPLIFIED SIGNAL

COMPUTERIZED GAME BOARD

FIELD OF THE INVENTION

The present invention relates to games and toys generally and to methods of determining the position of toy figures and game pieces on game boards.

BACKGROUND OF THE INVENTION

During the last few years, various games and toys have been developed in which a computer reacts to the physical location of a game controller.

Joysticks, mice and trackballs are well known in the art as game controllers. In addition, three-dimensional controllers such as a three-dimensional wireless mouse have been developed recently. Unlike a mouse which is a device that measures relative movement, the Mattel PowerGlove, which is worn on the hand and arm as a glove or the "Flock of birds" by Ascension Technologies, senses the absolute position of the controller relative to a static detector.

The use of a sword in a virtual reality game is also known. In this type of game the location and movement of the sword in physical space control the interaction of the player with the virtual world. In other, simpler games, a gun is pointed towards a screen and hits are registered based on the aiming point of the gun and the location of target figures on the screen.

Many modern computer and video games stand in contrast to traditional board games, in that they offer a dynamic environment with rapidly changing situations, in which the medium, typically the computer, responds to the players' actions. In these games the response speed of the players is generally an important factor.

Computer and video games have many drawbacks, which are particularly apparent in games played by children. First, the "pieces" in these games are merely illuminated shapes on a flat screen and, therefore, the players cannot hold or feel the "pieces". Similarly, the artificial environment provided by the background scene is perceived only visually, through the eyes of the player, and even the visual perception is not complete and natural as in the traditional games. Additionally, a child playing computer or video games generally remains seated for long periods of time, facing a video screen and is, therefore, temporarily disconnected from the real world and the people in it.

There have been attempts to construct a game board which offers advantages of both the traditional board games and the modern computer or video games. Such combined board game systems should generally be capable of detecting the presence of playing pieces at different locations on the game board and, preferably, it should be also capable of identifying the detected pieces.

British Patent 2,103,943 describes a sensing board and sensible pieces, wherein tuned circuits (i.e. resonators) in the pieces are sensed by circuits in the board associated with position "cells" using electromagnetic induction. The tuned circuits in the pieces include coils and capacitors. Due to coupling between the coils in the playing pieces and the coils in the board, signals fed to the board stimulate the resonators and pick up the resonant signal produced. Different pieces or different types of pieces have different resonant frequencies, such that pieces or types of pieces can be identified based on the frequency of the signal picked up in a given cell on the board.

The board incorporates two groups of circuits, each group having a circuit associated with each cell. One group of cells stimulates the resonators in any pieces on the cells by transmitting electromagnetic signals and the other group receives signals produced by the resonators in the cells in response to the stimulation. The coils in each group are interconnected and are individually addressable via a diode associated with each coil.

In determining the presence of a piece at a cell, a pulse of electric current is supplied to the stimulating (transmitting) coil of the cell, whereby a rapid change in current at the trailing end of the pulse results in oscillation of the resonator in the piece situated at the cell at its resonant frequency. The resonant oscillation induces a current signal in the sensing coil associated with the cell which signal is amplified and thresholded. For signals greater than the threshold, the oscillation frequency is measured to yield a corresponding digital signal. When a cell is empty, i.e. it does not accommodate a piece, there is no resonant "ringing" and, therefore, the number of transitions is detectably low.

An improvement to the "sensing" game board of British Patent 2,103,943 is described in U.S. Pat. No. 5,188,368. In the U.S. Patent, the pieces include an oscillator which is triggered by a signal received from the stimulating coil. A feedback oscillator which is initially triggered by the received signal resonates at a frequency determined by circuit elements in the playing pieces. As in Patent '943, the coils in Patent '368 are coupled in a configuration which allows sensing of one cell at a time but does not allow simultaneous addressing of more then one cell.

Since, in both of the systems described above, transmission and detection via the coils under the board cells is performed sequentially, i.e. one cell at a time, the reaction times of these systems are limited by the time it takes to scan all of the cells on the board. If the game requires a large number of cells, the system can be expected to respond relatively slowly to moves made by the players. For example, if the game board is a chess board including 64 cells, the reaction time is limited by a typical scanning time of approximately 0.6 second. If the game board includes 512 cells, which is a typical number in modern board games, the reaction time may reach an annoyingly long interval of more than 5 seconds.

The following patents also describe position sensing boards, some of which are capable of differentiating between different playing pieces, based on their inherent qualities: U.S. Pat. No. 5,088,928, GB2237514, U.S. Pat. No. 5,082,286, DE 3813779, FR 2607400, U.S. Pat. No. 4,341,385 and SE 7812190.

On a different physical scale, Nintendo produces a large area mat which senses the position of a person on the mat and which is incorporated in games.

Sensing of positional attributes of playing pieces and reacting accordingly is also performed in pinball machines which sense the location of a pinball using a remote sensor. A ski-game, disclosed in patent SU 844011, uses photocells to detect if ski-figure playing pieces are correctly located on a ski track and keeps score.

U.S. Pat. No. 5,169,516 discloses an interactive action toy system, in which two toy figures react to each other based on an engagement between them. In computer arcade games such as "Archon" and "Battle Chess", playing pieces fight on screen in response to movement commands by players.

SE 7812190, U.S. Pat. No. 4,341,385, GB 2237514, U.S. Pat. No. 5,088,928 disclose computer games wherein a computer reacts to the position and/or status of a playing piece on a physical board by playing sounds and/or video graphics.

U.S. Pat. No. 5,330,380 discloses a system which plays a prerecorded message based on the identification of an action figure or toy. It is also known, for example, in EP 606790, to incorporate a audio device inside an action figure. When the apparel of the action figure is changed, a variety of sounds are emitted by the device.

SUMMARY OF THE INVENTION

The present invention seeks to provide new dimensions in computer games and board games.

There is thus provided in accordance with a preferred embodiment of the present invention a combination computer game and board game including a game board, a plurality of toy figures selectably positionable by a player with respect to the game board, apparatus for automatically and non-discretely sensing the location of the toy figures relative to the game board and actuating an audio/visual display sequence in response thereto.

In accordance with a preferred embodiment of the present invention, the apparatus for automatically sensing the location is operative to provide an output indication of the motion of the toy figures and to actuate an audio/visual display sequence in response thereto.

Further in accordance with a preferred embodiment of the present invention, the apparatus for automatically sensing the location is operative to provide an output indication of the direction of motion of the toy figures and to actuate an audio/visual display sequence in response thereto.

Additionally in accordance with a preferred embodiment of the present invention, the apparatus for automatically sensing the location is operative to provide an output indication of the orientation of the toy figures and to actuate an audio/visual display sequence in response thereto.

Preferably, the apparatus for automatically sensing is operative in three dimensions.

Preferably, the apparatus for automatically sensing is operative in a wireless mode of operation.

In accordance with a preferred embodiment of the present invention, the apparatus for automatically sensing is operative in a wireless mode of operation which does not require a line of sight to the toy figures.

In accordance with a preferred embodiment of the invention, at least some of the toy figures have switches mounted thereon, whose operation is employed to actuate an audio/visual display sequence.

There is also provided in accordance with a preferred embodiment of the present invention a combination computer game and toy including at least one toy figure selectably positionable by a player in three dimensions and apparatus for automatically and non-discretely sensing the orientation of the toy figure and actuating an audio/visual display sequence in response thereto.

In the foregoing embodiment, the orientation of the toy figure may include one or more of the following parameters: position, movement, direction and direction of movement.

Preferably, the apparatus for automatically sensing is operative to actuate an audio/visual display sequence also in response to one or more of the following parameters: position, movement, direction and direction of movement in the present and the past.

In accordance with a preferred embodiment of the invention, the apparatus for automatically sensing is operative to differentiate between different types of movement.

Further in accordance with a preferred embodiment of the present invention, the apparatus for automatically sensing is operative to sense changes in orientation of a toy figure in more than three degrees of freedom, and most preferably six degrees of freedom.

It is a further object of one aspect of the present invention to provide an improved electronic game board, including an electromagnetic game table and apparatus for rapidly scanning the game table to determine the position and/or status of the game pieces on the board. According to the present invention, the reaction time of the electronic game board to game board situations is very short, compared to prior art devices, and remains short even when the game board includes a large number of cells. For example, the average reaction time of a 512 cell board constructed according to the present invention can be as low as 10 milliseconds.

According to one aspect of the present invention, an excitation coil is associated with each cell on the game table and a sensing antenna is associated with the entire game table. Playing pieces or game or toy figures, each including a transponder, are located on some of the cells of the game table. A plurality of excitation coils generate query signals which are received by the transponders of all playing pieces located on cells at which a query signal is generated. The transponder in the playing piece then generates a coded answer signal, preferably having a frequency unique to the piece or the type of piece, which is received by the sensing antenna. The antenna, which may receive more than one answer signal, generates a sensor signal responsive to the answer signal.

In general it is contemplated by one aspect of the invention, to excite a given group of cells on the game table, generally by row and column, wherein each excitation coil is connected to a given row and a given column. Since all of the pieces in the excited row or column are queried simultaneously, the measured sensor signal is a signal resulting from superimposed answer signals produced by more than one playing piece. Sensor signal components relating to different pieces are isolated using appropriate signal processing, in accordance with a preferred embodiment of the invention.

According to a preferred embodiment of the present invention, the unique signals, which are preferably discrete frequencies, generated by the different pieces or types of pieces are utilized not only for uniquely identifying the pieces or types of pieces, but also for determining the location of each piece on the table. To this end, all of the rows and all of the columns are scanned. If a given piece (or type of piece) generates a unique frequency that frequency will be detected only for the row and column on which the piece is located. In this way, by determining the row and column which give the unique response associated with the piece, the location of the piece is determined.

According to another aspect of the present invention, an excitation antenna and two, orthogonally positioned, sets of sensor coils are associated with the game table. The excitation coil generates an excitation signal to be picked up by all the pieces on the table. One set of sensor coils is oriented and configured to determine the x-position of the pieces and the other set is oriented and positioned to determine the y-position of the pieces. Preferably, each set of coils includes two coils each of which includes a plurality of, preferably rectangular, sub-coils, of varying widths. In each pair of coils, the sub-coils of one sensor coil preferably have one edge of the sub-coil aligned with one edge of the table while the sub-coils of the other sensor coil are aligned with the opposite edge of the table. The edges of the sub-coils perpendicular to the one edge are aligned with edges perpendicular to the one edge and the fourth side of the sub-coils is parallel to the first side and defines a different width for each sub-coil. A processor associated with the sensor coils determines the X-axis positions of pieces on the table (each of which has a unique response signature) in a non-discrete manner based on the two sensor signals generated by the one pair of coils, preferably based on the sum and difference of the signals. The processor also determines the Y-axis positions of the pieces based on the two sensor signals generated by the other pair of coils.

While a rectangular antenna encompassing the entire game table can be used as the excitation antenna, in a preferred embodiment of this aspect of the invention, the excitation antenna includes a plurality of sub-antennae, each having a different configuration on the table and, possibly, a different number of loops. Preferably, the sub-antennae are designed and configured to provide a substantially homogeneous sensor signal level independent of the position of the pieces on the table.

The Z position of the figure (above the table) may be determined the strength of the answer signal. When a plurality of spaced transponders are incorporated in a toy figure, two or more orientations of the toy figure may be determined. If two transponders are employed, the orientation in two axes may be determined, in addition to the three position coordinates; if three properly positioned transponders are used, all six orientation and position coordinates may be determined.

It is another object of the present invention to provide an improved game board having a generally traditional appearance but incorporating electronic, preferably computerized, features of active medium games such as computer or video games. In a preferred embodiment of the present invention, a player of the game interacts with a game board, with playing pieces, with a computer, with electronic features on or near the game board and preferably with other players. A number of players may sit along the sides of the board, as in traditional board games, while playing advanced active medium games. The game board may also comprise a "story board" in which a story, on a video screen depends on the positions of the figures. Other games such as improved arcade target games and doll games are also possible in preferred embodiments of the invention.

Additionally, computer multimedia features, such as a computer display and computer sound capabilities are utilized to further enrich the game. Electric devices such as lamps, loudspeakers, etc., and various mechanical gadgets such as trap doors, levers, etc., which may also be associated with the system of the present invention, are preferably activated and controlled by the computer.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
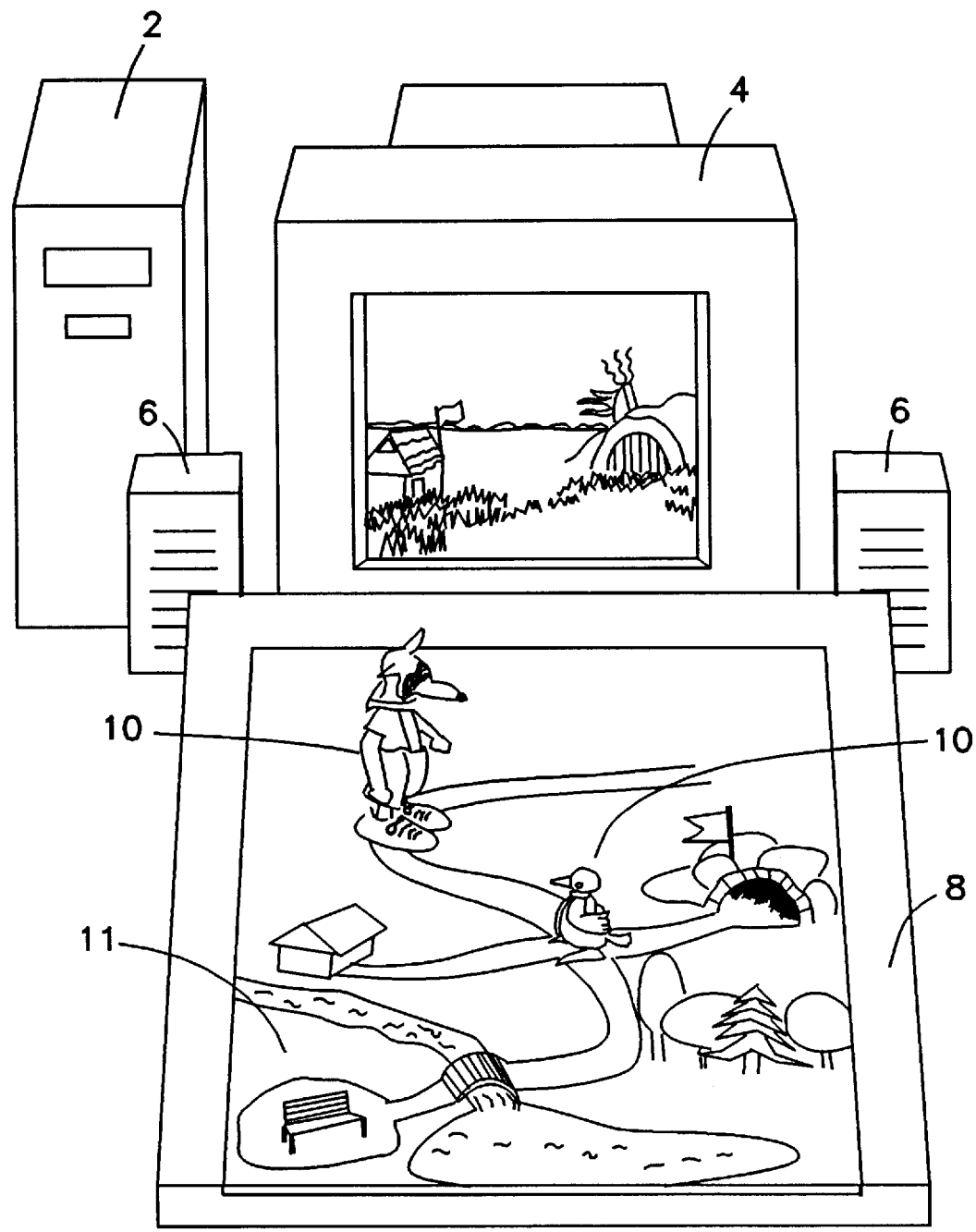
FIG. 1 is a simplified illustration of a combination board game and computer game constructed and operative in accordance with a preferred embodiment of the present invention.

Reference is now made to FIG. 1, which illustrates a combination computer game and board game constructed and operative in accordance with a preferred embodiment of the present invention. The combination computer game and board game preferably comprises a conventional computer 2, such as a personal computer or a video games computer, which is associated with a display 4 and speakers 6. Operatively associated with computer 2, typically via a serial port thereof, is a game table 8 with respect to which toy FIG. 10 may be selectably positioned.

Figure 21:
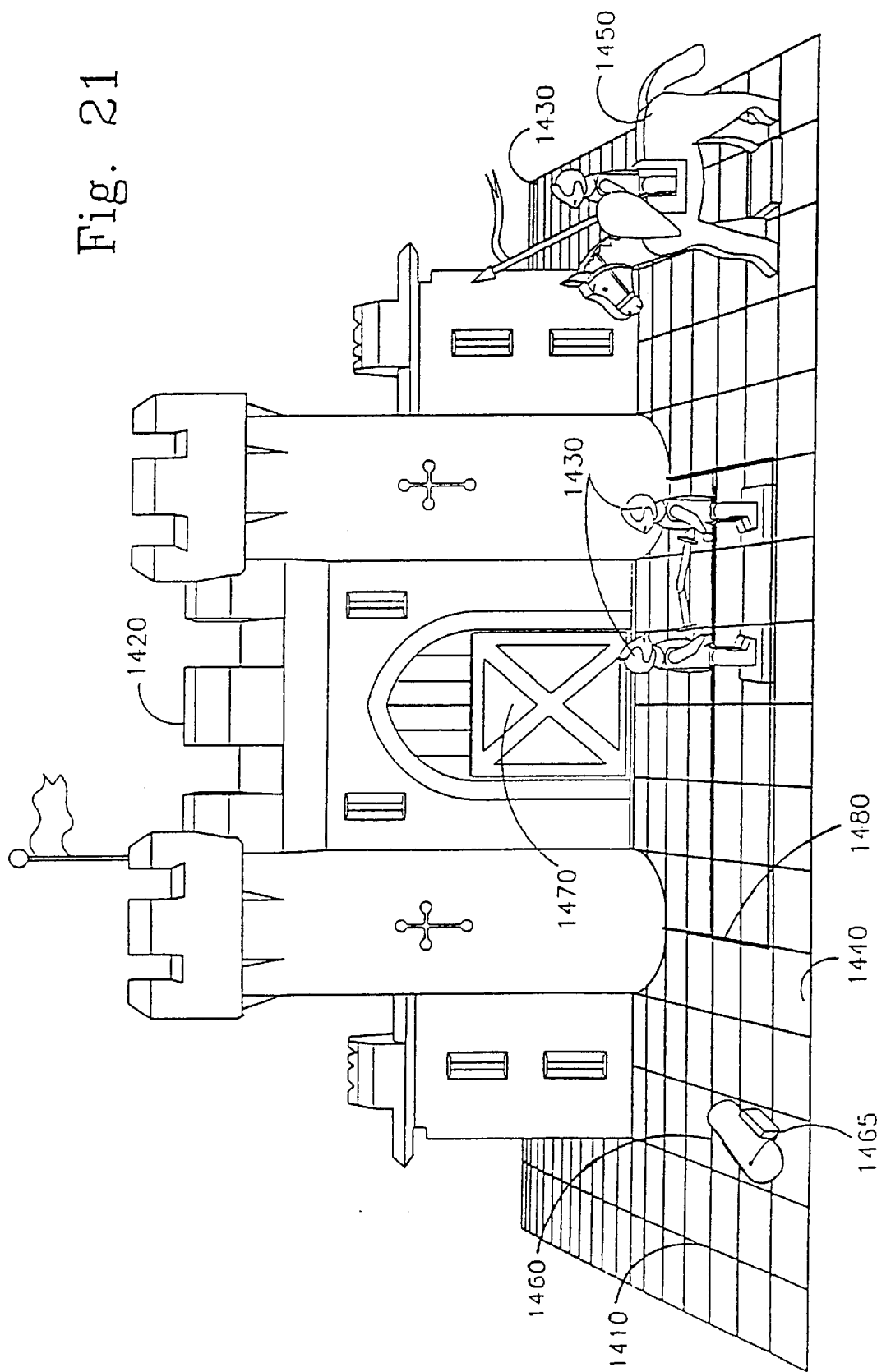
FIG. 21 is a simplified pictorial illustration of an exemplary electronic game board system according to the present invention, adapted for playing "The Game of Knights"

A replaceable printed game board or sheet 11 having a printed scene or other printed indicia related to the specific game being played is placed on game table 8 and pieces 10 are placed on board 11. While sheet 11 is shown as a two dimensional image, a three dimensional image such as shown in FIG. 21 is also useful in the practice of the invention. The sheet may be made of paper, cardboard, plastic or any electrically non-conductive material when the positions of the pieces are detected according to the preferred method of detection described below.

In a preferred embodiment of the invention, the board or sheet which is in place may be automatically identified by the system. Based on this identification, the computer calls up a game program which corresponds to the game represented by the board or sheet. Similarly, a "game book" or "interactive story book" may consist of a number of sheets which constitute progressive portions of the game or story. The system determines which sheet is in place and the game program is adjusted to suit the sheet. The sheets may also be in the form of a book, each side of a page covering half of the game table. The system determines which sheets are on the left side of the table and which are on the right side and based on this determination the two visible sheet sides are known.

In a preferred embodiment of the invention, the sheets are identified in a manner similar to that described below for identifying the toy figures.

Figure 9:
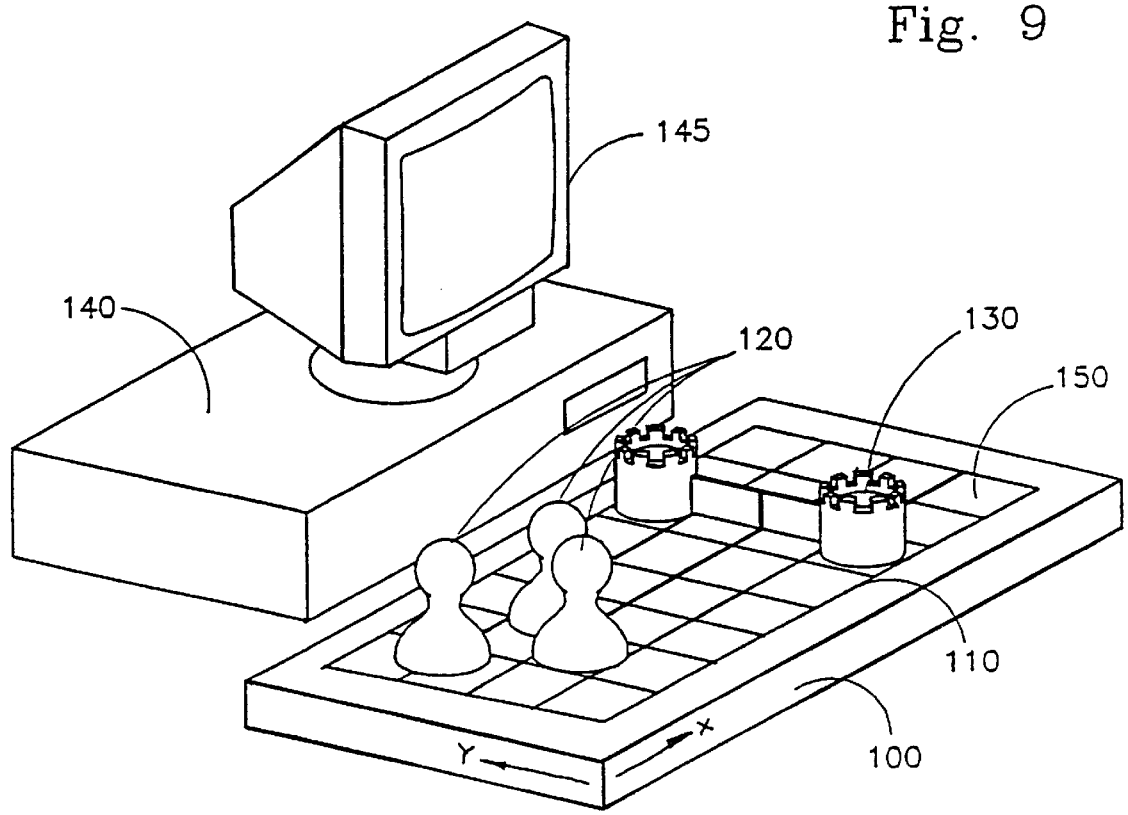
FIG. 9 is a simplified pictorial illustration of an electronic game board system, constructed and operative in accordance with one aspect of the present invention.
Figure 10:
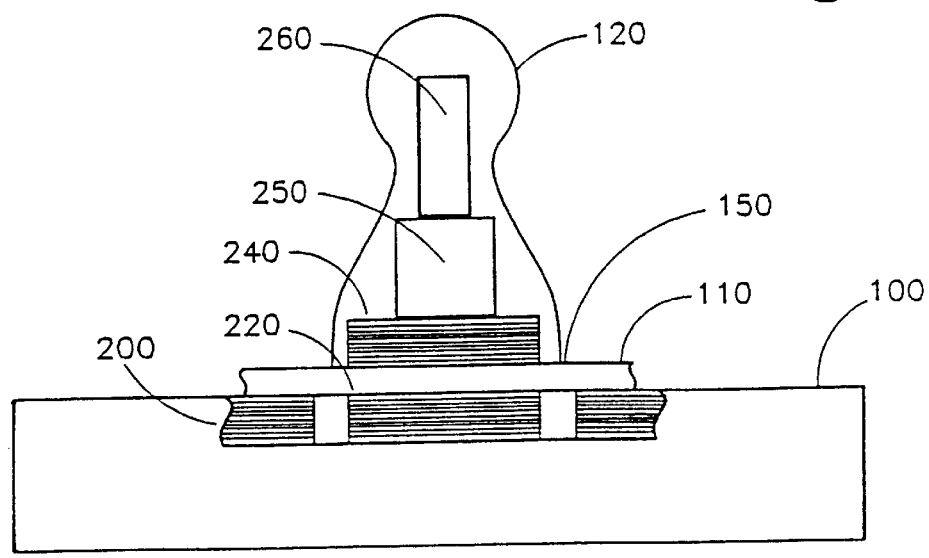
FIG. 10 is a cross-sectional, schematic, illustration of one playing piece associated with the system of FIG. 9, showing schematically the internal circuitry of the playing piece and a portion of a game board underlying the piece.

In accordance with a preferred embodiment of the invention, there is associated with game table 8, apparatus for automatically sensing the location of toy FIG. 10. This apparatus may be any suitable apparatus, but is preferably three-dimensional, non-line of sight wireless apparatus of the type shown and described hereinbelow with reference to FIGS. 9–18.

Figure 22:
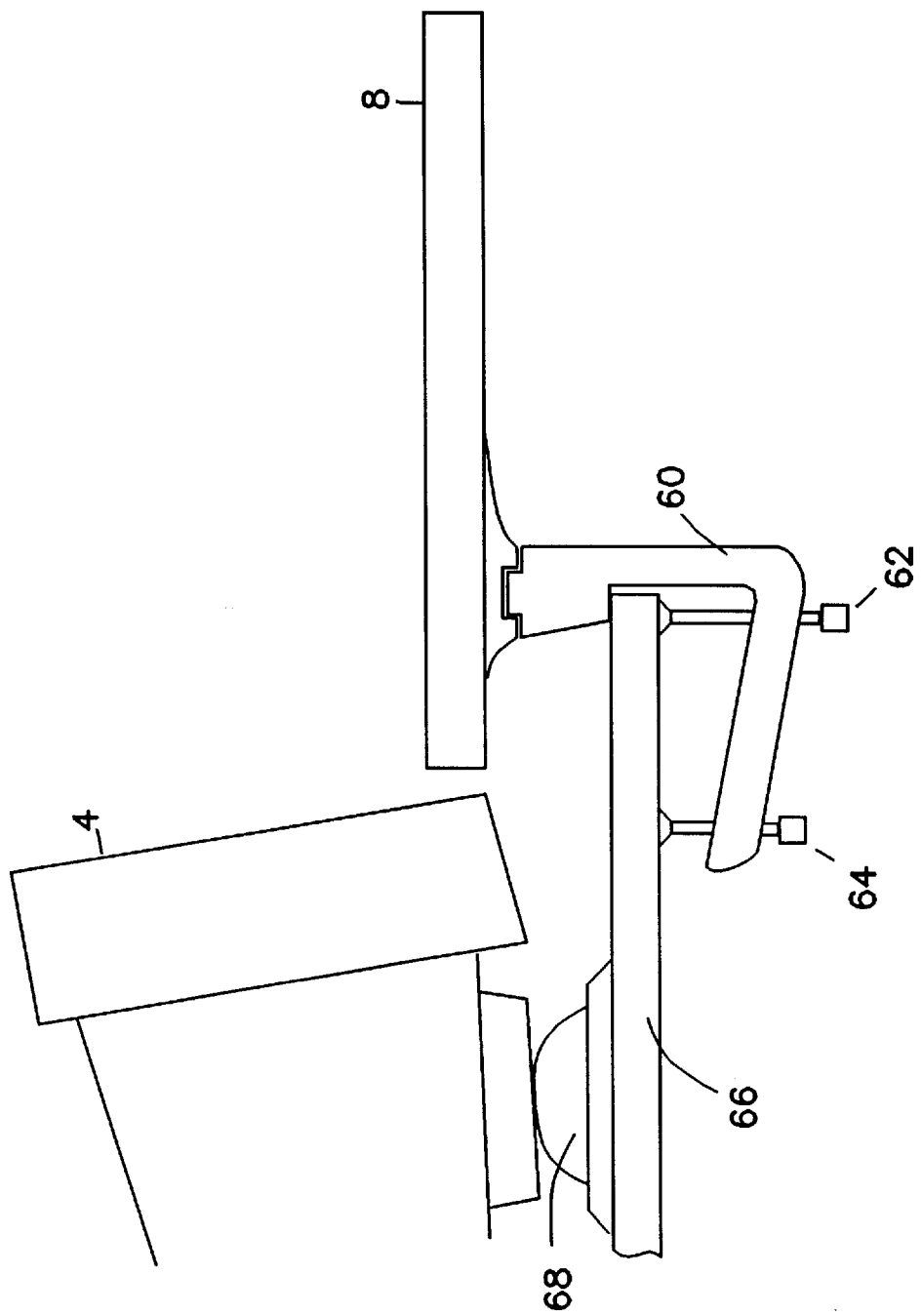
FIG. 22 illustrates a preferred method of mounting a game board of the invention on a table top.

Preferably, game table 8 is removably mounted onto a support surface, such as a table top 66, at a height close to the bottom of the screen surface of the display 4, as illustrated in FIG. 22. Display 4 is conventionally situated on a base 68 such that the height of the display is well above the table height. In order to heighten the illusion that printed board or sheet 11 is a part of the display, table 8 is raised by the mounting mechanism shown in FIG. 22 in which a pair of leveling screws 64 are adjusted to level the table and a pair of quick release screws 62 are used to secure the table on table top 66.

Typical operation of the apparatus of FIG. 1, will now be described with reference to FIGS. 2A–2E. It is seen from FIG. 2A, that when one of the toy figures, here a fox 12, is located in his home, indicated on the game board by reference numeral 14, a video sequence is displayed showing him at home and an appropriate audio message representing that figure is preferably transmitted. For example, the video sequence may show the fox in his home environment speaking about, and/or interacting with the environment.

Figure 2B:
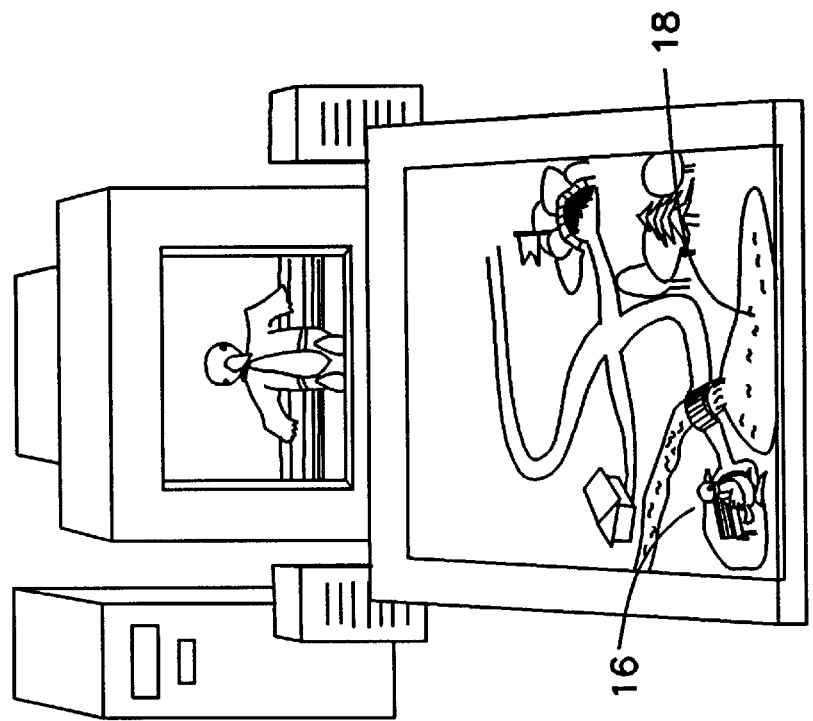
FIGS. 2A, 2B, 2C, 2D & 2E are illustrations of various typical operative states of the apparatus of FIG. 1.
Figure 2A:
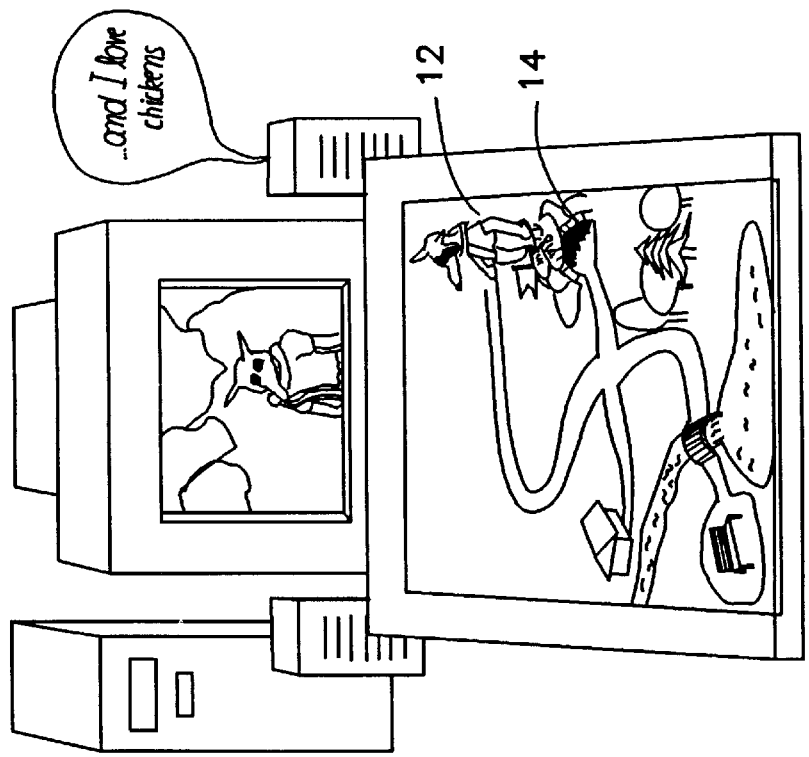

FIG. 2B illustrates another toy figure, here a crow 16, located beside a pond indicated on the game board by reference numeral 18. A video sequence is displayed showing the crow at the pond and an appropriate audio message representing that figure is transmitted. For example, the video sequence may show the crow on the side of the pond speaking about, and/or interacting with the environment. Sounds representing the site may be part of the audio.

Figure 2C:
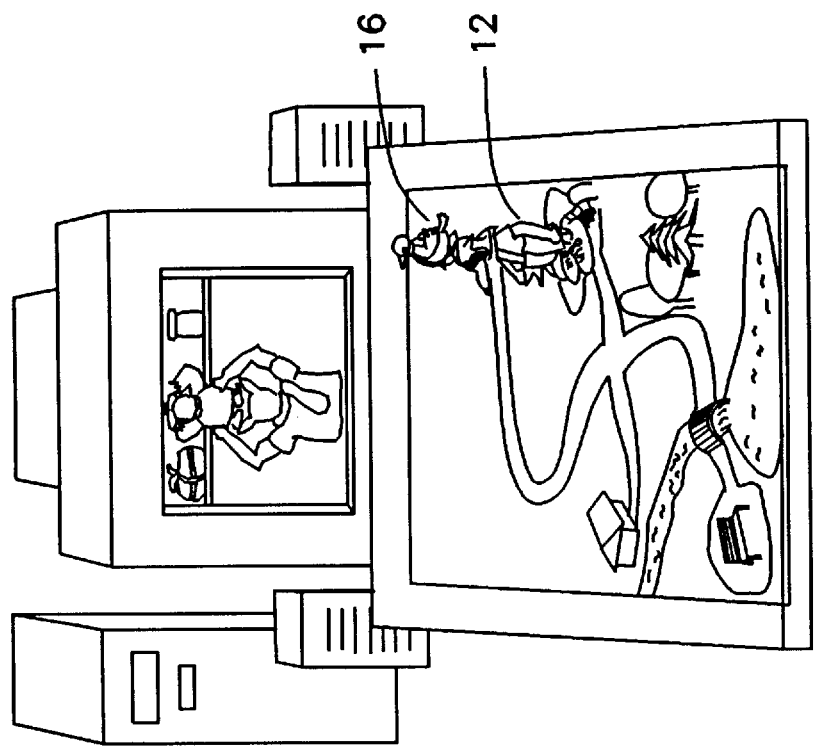

FIG. 2C shows that when two of the toy figures, here fox 12 and crow 16, are both located at a given location, such as the home of the fox, indicated on the game board by reference numeral 14, a video sequence is displayed showing interaction between the two figures within the same given area and an appropriate audio output containing conversation of the two figures at that given location is preferably transmitted.

Figure 2D:
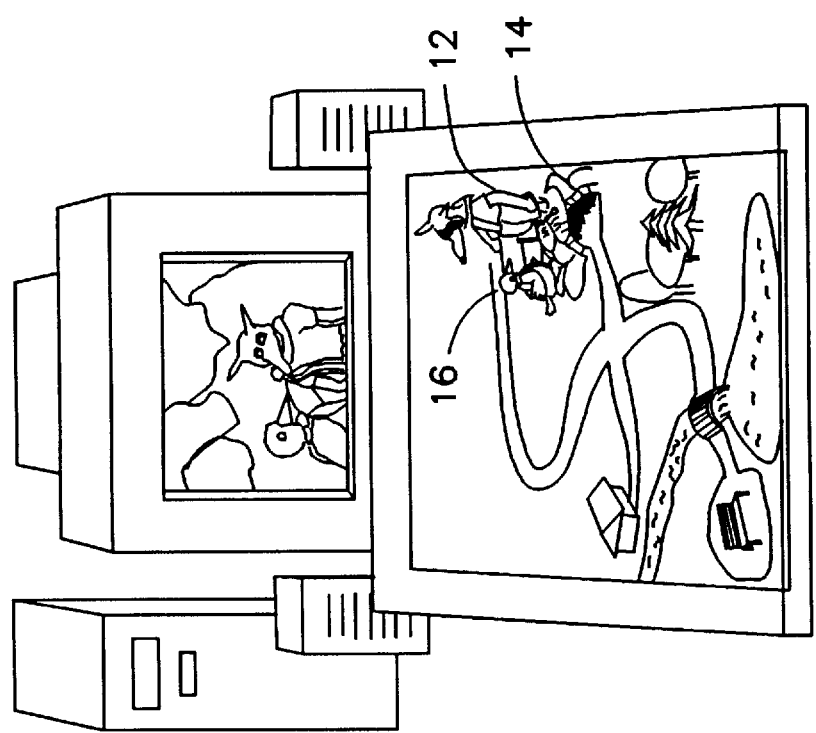

FIG. 2D illustrates a particular case of the functionality of FIG. 2C, wherein one of the toy figures, crow 16, is located on the head of the other of the toy figures, fox 12. A video sequence is displayed showing interaction between the two figures at the same X-Y location and an appropriate audio output containing conversation of the two figures at that given location is transmitted.

Figure 2E:
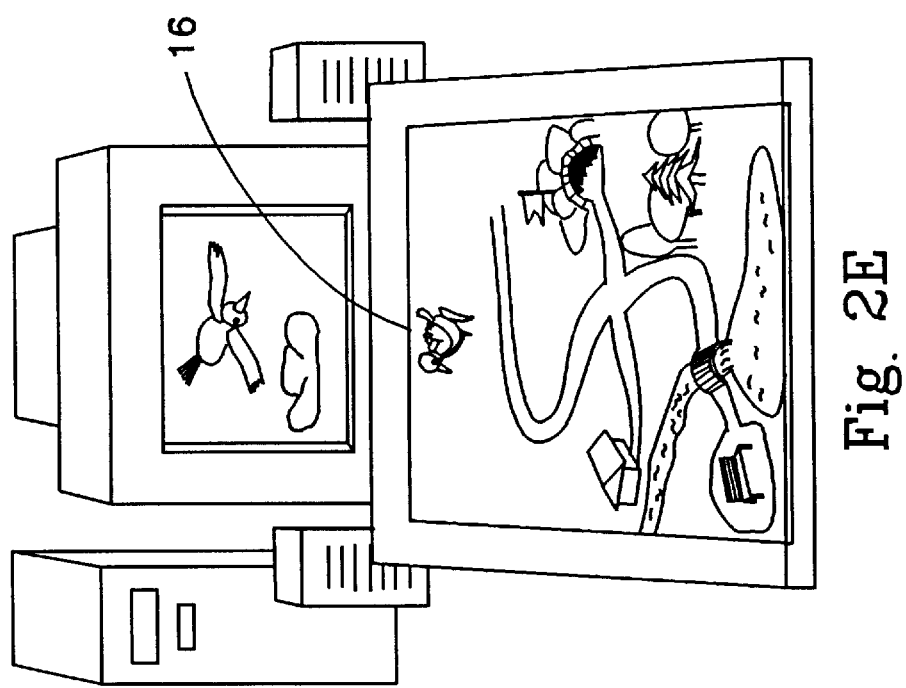

FIG. 2E illustrates a case wherein a toy figure, here crow 16, is located above the game board, as if it were flying. A video sequence is displayed showing the crow flying and an appropriate audio output related to the crow flying is transmitted.

Other audio and audiovisual outputs may involve sounds which are characteristic of the position of the toy figures on the board, such as the sound of water, birds, chickens or other sounds related to images printed on the game board or sheet.

Figure 3:
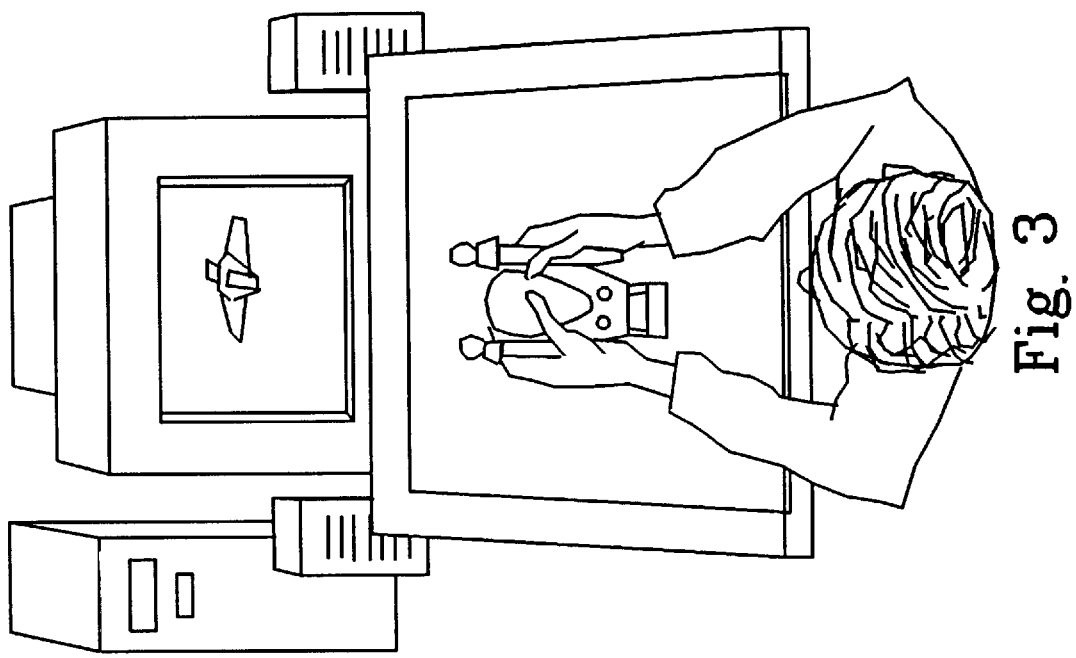
FIG. 3 is a simplified illustration of a combination board game and computer game constructed and operative in accordance with another preferred embodiment of the present invention.

Reference is now made to FIG. 3 which illustrates a combination computer game and board game constructed and operative in accordance with another preferred embodiment of the present invention. The hardware, other than the toy figures, may be identical to that employed in the embodiment of FIGS. 1–2E.

In the embodiment of FIG. 3 a shooting game is provided wherein at least one of the position, motion and orientation of the toy figure in three dimensions is employed both in terms of incoming fire directed thereat and in terms of its firing at "enemies" on the screen or other toy figures. Preferably at least four degrees of freedom of the toy figures are sensed. In a preferred case five or six degrees of freedom of the toy figures are sensed.

Figure 4B:
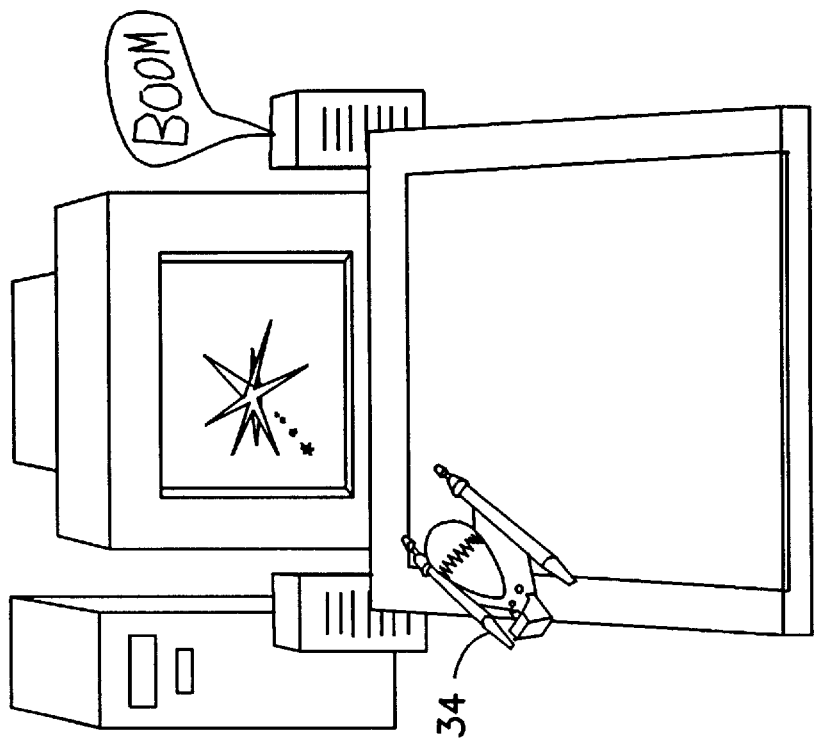
FIGS. 4A, 4B, 4C and 4D are illustrations of various typical operative states of the apparatus of FIG. 3.
Figure 4A:
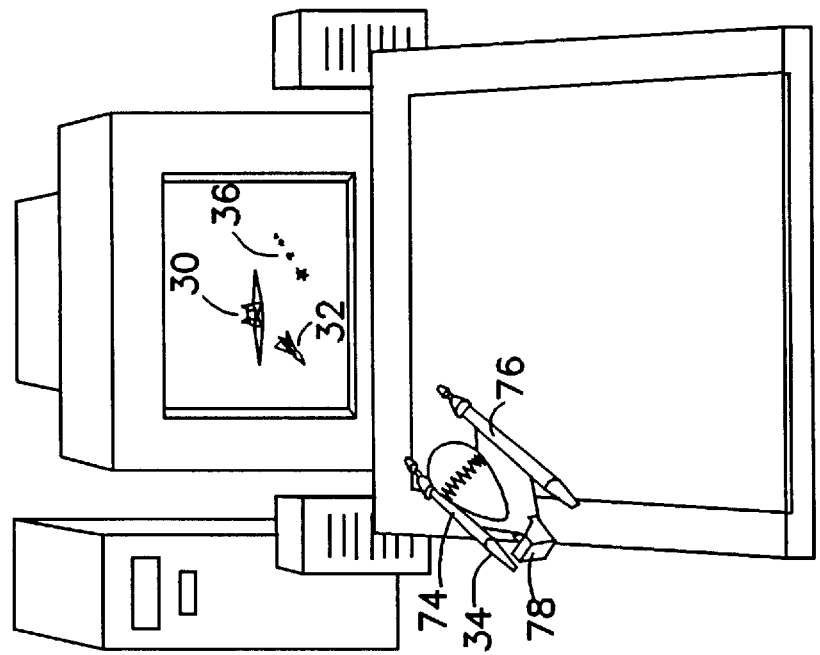

FIG. 4A illustrates a situation wherein the "enemy" 30, shown on the display screen, shoots a missile 32 towards the sensed position of a toy FIG. 34. The toy FIG. 34 shoots bullets 36 which appear on the screen in accordance with the position and orientation of the toy figure. The toy figure may also be moved by the player to avoid being destroyed.

Figure 4C:
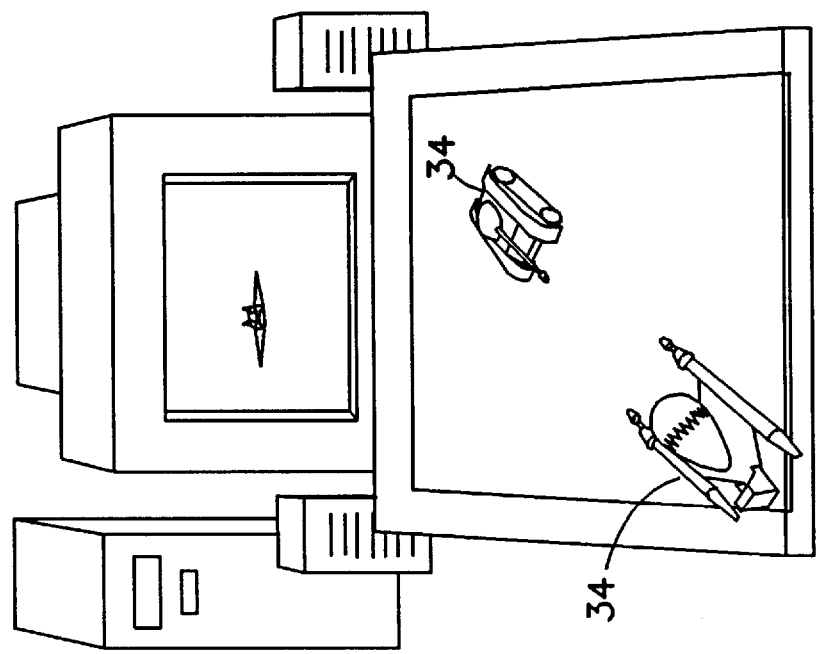

FIG. 4B shows audio and visual effects of a "hit" produced by the toy FIG. 34 shooting the "enemy" on the screen. FIG. 4C shows the audio and visual effects of a "hit" produced by the enemy shooting the toy FIG. 34. Inasmuch as toy FIG. 34 must remain intact, the visual effects appear only on the screen, but are located so as to give the effect of a hit on the toy FIG. 34 at its sensed location.

Figure 4D:
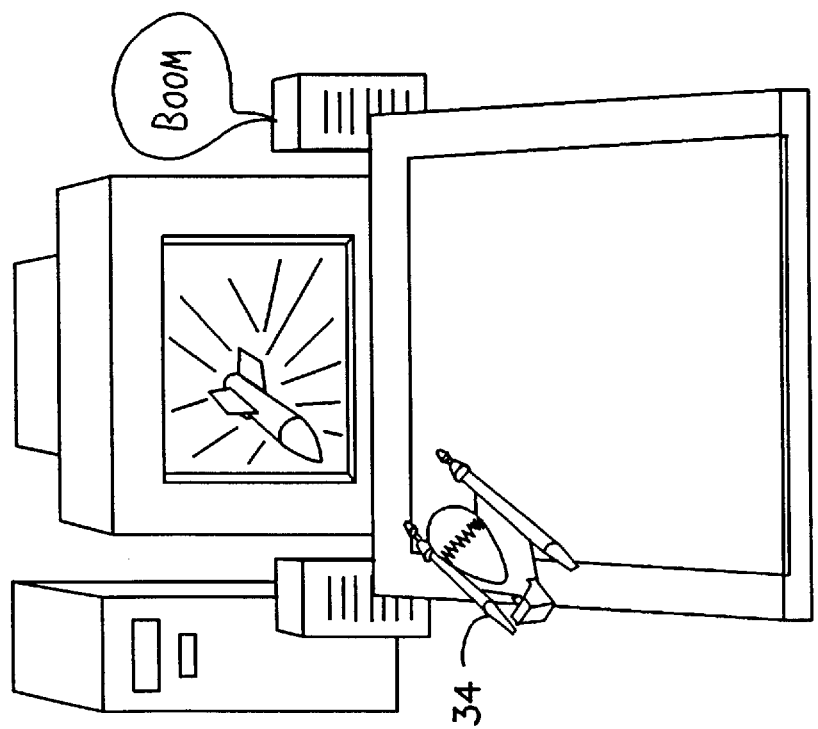

FIG. 4D illustrates a game played with two or more toy FIG. 34 which can shoot at each other.

Figure 5:
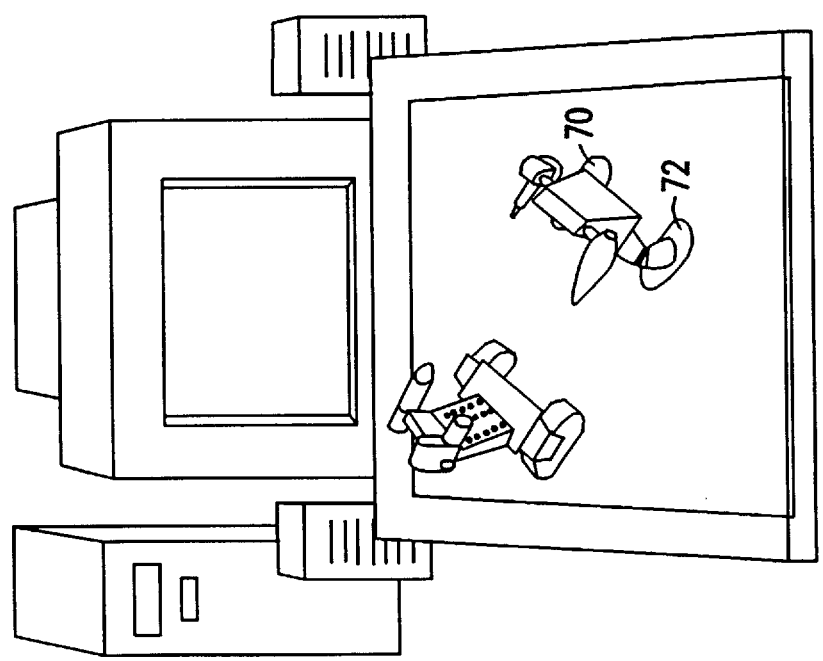
FIG. 5 is a simplified illustration of a combination board game and computer game constructed and operative in accordance with yet another preferred embodiment of the present invention.

Reference is now made to FIG. 5 which illustrates a combination computer game and board game constructed and operative in accordance with yet another preferred embodiment of the present invention. The hardware, other than the toy figures, may be identical to that employed in the embodiment of FIGS. 1–4D.

In the embodiment of FIG. 5 amplified audio and possible also video outputs are provided in response to movements of toy figures. The positions, movements and orientations of the toy figures in three dimensions may also trigger animated displays on display 4.

Figure 6A:
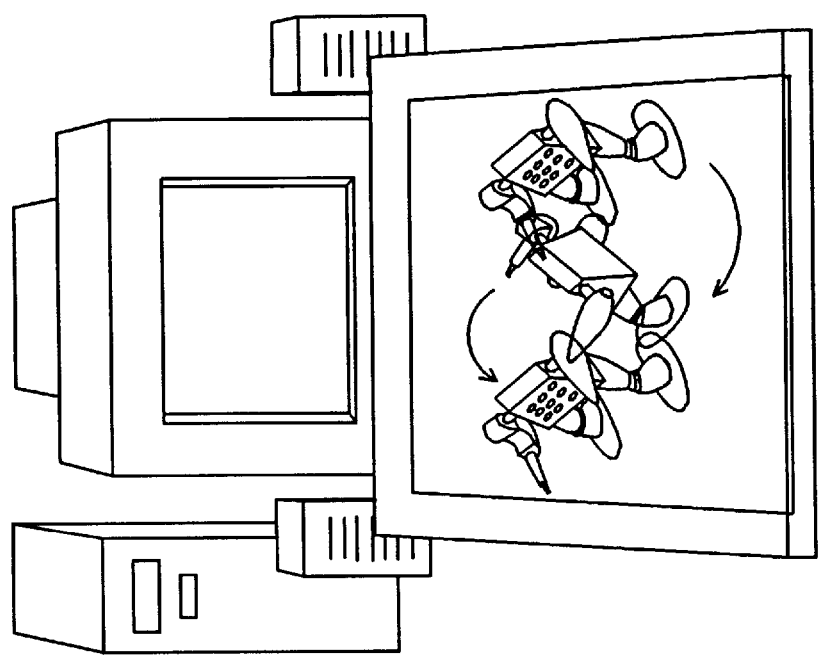
FIGS. 6A, 6B and 6C are illustrations of various typical operative states of the apparatus of FIG. 5.

FIG. 6A illustrates in detail how a step movement is detected in accordance with a preferred embodiment of the invention and shows that steps are made up of a sequence of angular movements interrupted by a lack of movement. Logic provided by suitable software identifies each step (by identifying the azimuthal angle change and rate of change) and provides a "step sound" corresponding thereto. The greater the amplitude of the step, the louder may be the sound.

Figure 6C:
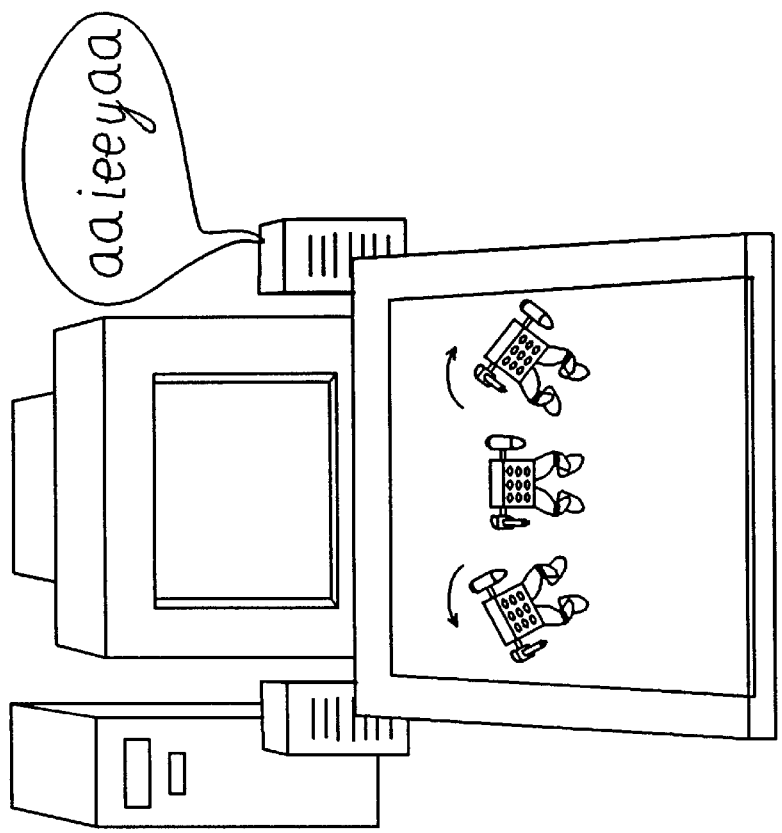
Figure 6B:
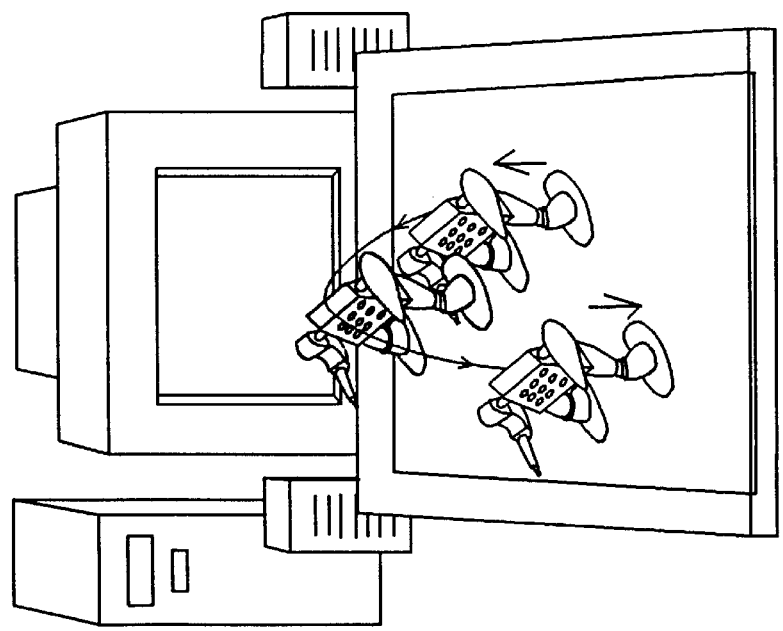

Similarly, jumps may be detected and represented by sounds whose loudness may correspond to the amplitude of the jump, as shown in FIG. 6B. Preferably, the sounds are synchronized in real time with the movements of the toy figures.

The direction and location of the figures undergoing movement may be represented also by loudness and frequency changes in the sounds, similar to what would occur in reality.

Other types of movements, such as side-to-side or rolling movements may also be identified with particular sounds, such as in a Karate environment, as shown in FIG. 6C.

Figure 7:
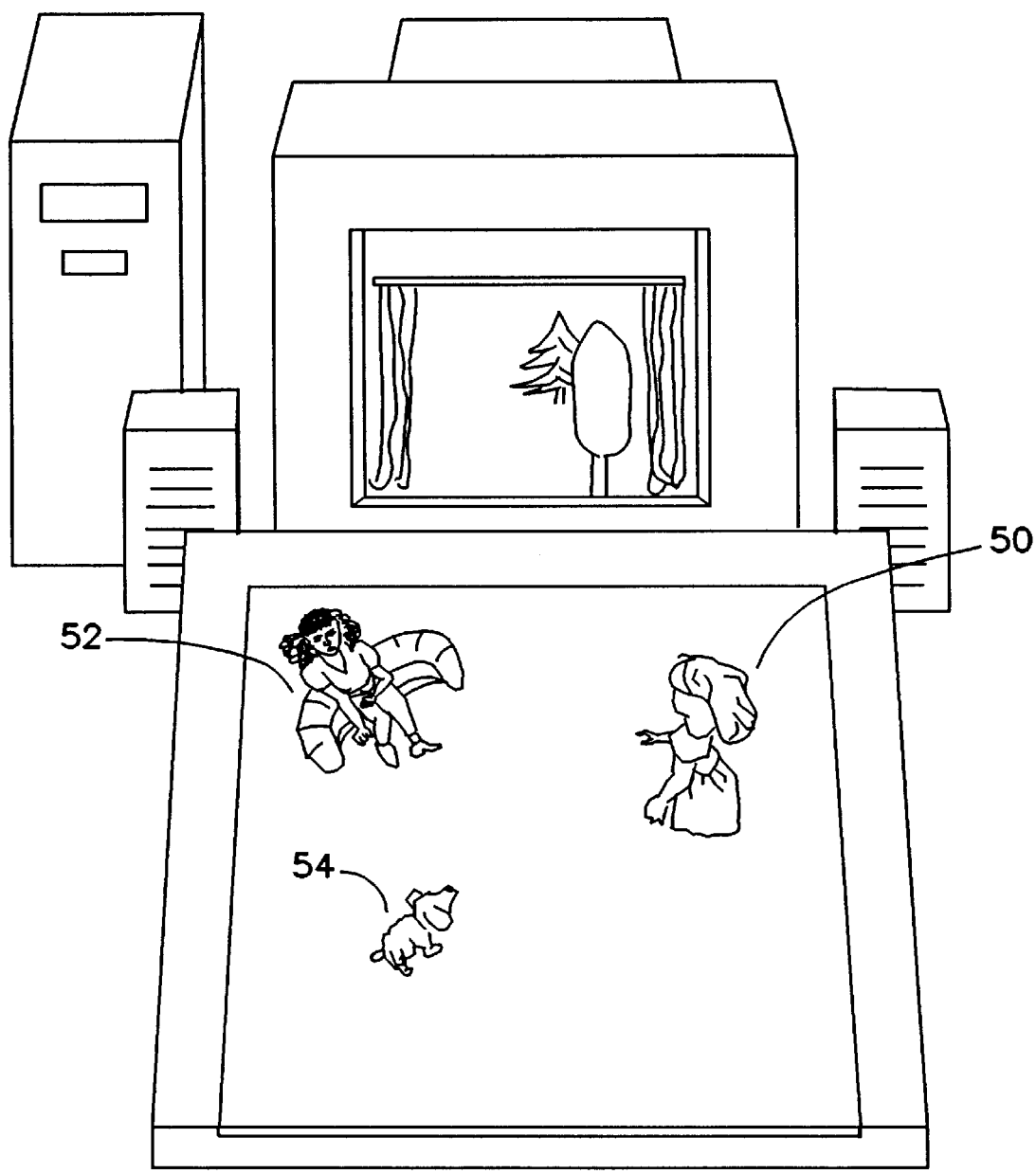
FIG. 7 is a simplified illustration of a combination board game and computer game constructed and operative in accordance with still another preferred embodiment of the present invention.

Reference is now made to FIG. 7 which illustrates a combination computer game and board game constructed and operative in accordance with yet another preferred embodiment of the present invention. The hardware, other than the toy figures, may be identical to that employed in the embodiments of FIGS. 1–6C.

In the embodiment of FIG. 7 the directionality of the orientation of toy FIGS. 50, 52 and 54 is of particular importance. Both audio and video sequences are provided responsive to the relative orientations of the figures to each other. Thus when two dolls 50 and 52 face each other within a given distance, they speak. When one doll faces a dog 54, the dog may bark or the doll may speak to the dog.

Figure 8B:
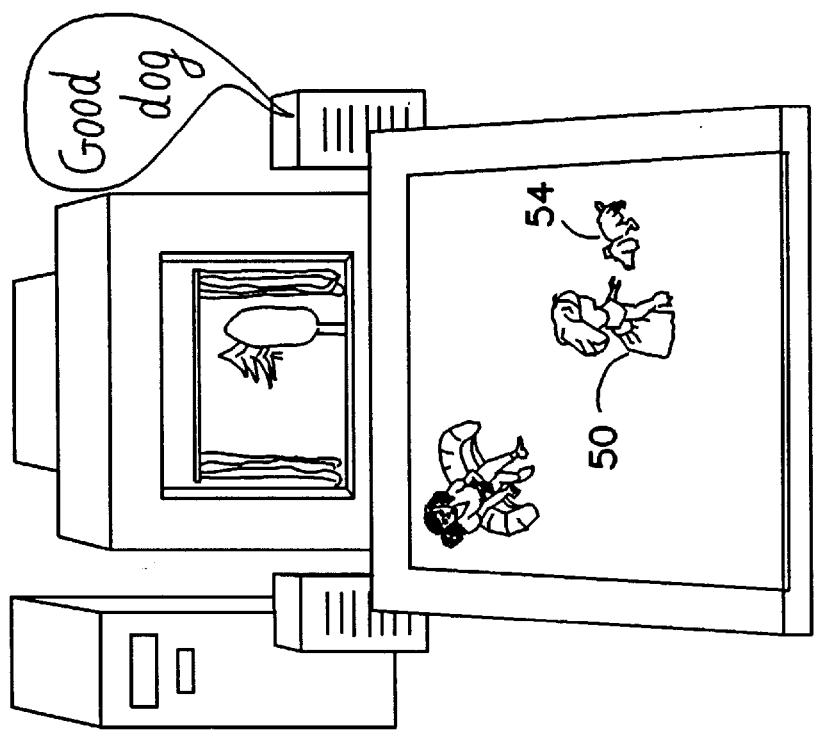
FIGS. 8A and 8B are illustrations of various typical operative states of the apparatus of FIG. 7.
Figure 8A:
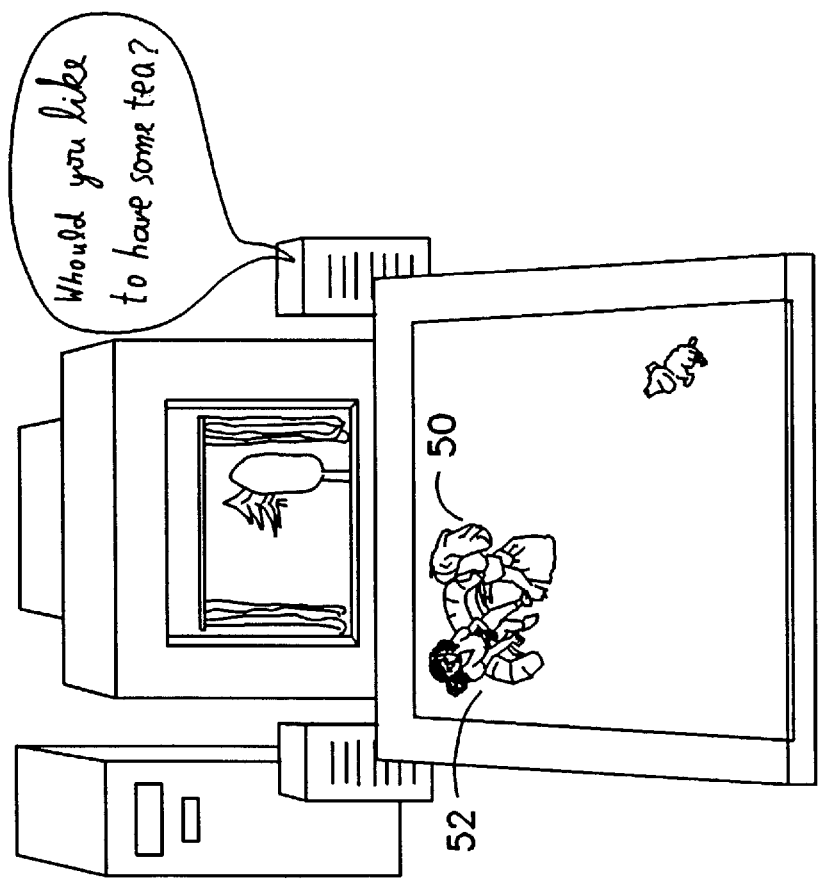

FIG. 8A illustrates a conversation between dolls 50 and 52 who are shown facing each other. FIG. 8B illustrates the dog barking and doll 52 speaking with the dog. The positions, movements and orientations of the toy figures in three dimensions may also be shown on a display screen.

FIG. 9 illustrates schematically an electronic game board system, constructed and operative in accordance with one aspect of the present invention. The system includes a game table 100 (corresponding generally to game table 8 of FIG. 1) associated with a processor unit 140, preferably a personal computer, and having a game board surface 110 including a plurality of cells 150. A plurality of toy or game FIG. 120 (for example playing pieces are shown in FIG. 9) are preferably placed on at least some of cells 150. Pieces 120 may generally be moved to other cells 150 in accordance with prescribed rules of a specific board game.

While the position and orientation apparatus of the invention is especially suited for use in games illustrated and described herein in FIGS. 1–8 and 18–21, FIG. 9 illustrates a more general use of the position determining apparatus of the invention. Furthermore, while the preferred methods of determining position and orientation for the described games are those described herein, other known methods of determining position and, optionally, orientation are also useful in the practice of some aspects of the invention.

In accordance with a preferred embodiment of the invention, circuitry (not shown on FIG. 9) for determining the location and identifying playing pieces 120 on board 110 is included in game table 100. The system preferably includes additional electronic devices 130, preferably controlled by processing unit 140, which preferably provide sensible indications of different game features and/or respond to movement of pieces on game board 110. Processing unit 140 is preferably programmed in accordance with the game played, such that inputs received from different elements of the system are correctly interpreted and appropriate outputs are provided to different devices in the system. Processing unit 140 is preferably associated with a display 145 and a sound producing device (not shown) to provide additional audio-visual capabilities. In a preferred embodiment, game table 100 communicates with processor 140 and associated devices, via a cable, infrared communication or other means to perform various functions in response to moves by the players.

FIG. 10 schematically illustrates a cross-section of a particular playing piece 120 associated with a given cell 150 on game board surface 110. The circuitry in each piece 120 preferably includes a coil 240, which preferably functions as a receiving-transmitting antenna. Coil 240 is preferably adapted to receive an excitation (query) signal, preferably a coded signal, which is generated by an excitation coil 220, as input to a transceiver circuit 250 in piece 120. Based on the query signal, transceiver 250 generates an answer signal which is transmitted by coil 240. The answer signal is sensed by a sensor coil (such as for example described hereinbelow) in an upper portion 200 of game table 100, which receives answer signals from a plurality of cells, preferably from all of the cells in the game board. Transceiver 250 is preferably powered by a power source 260 which may include a battery, preferably a miniature battery. Coil 240 and transceiver 250 together form a transponder which responds to query signals with an answer signal.

In a preferred embodiment, each piece 120 (or type of piece) generates a unique answer signal and, therefore, pieces 120 can be uniquely identified by processor unit 140, as described below. Coding of the query and answer signals may be based on frequency modulation, amplitude modulation, pulse modulation and/or time delay modulation, or any other known coding method. In one preferred embodiment of the invention, the answer signal includes a sinusoidal wave pattern having a frequency which is unique to the piece or the type of piece 120. Thus, according to this embodiment, a given piece 120 can be identified based on the frequency of its answer signal.

In a preferred embodiment of the invention, the identity of at least some of pieces 120 can be varied by adding or replacing elements of transceiver circuit 250. Preferably, various circuit elements (hereinafter plug-in circuits) are introduced by a carrier, plug-in, member (not shown) adapted for mounting to preselected locations on playing pieces 120, where there are appropriate electric connectors for connecting the plug-in circuit to transceiver circuit 250. Preferably, the external appearances of the plug-in members relate to their respective identities, in the context of the game played. For example, the plug-in members may be embodied in the form of replaceable hats, each containing a different plug-in circuit and defining a different game entity, whereby the codes defined by the different plug-in circuits correspond to the respective game entities. Variation of the answer signal code may be activated-through a code-controlling switch in transceiver circuit 250 which is switched to an appropriate position upon connection of the plug-in member to piece 120, or by a capacitor which changes the frequency generated by circuit 250.

In one embodiment of the invention, game table 100 includes one excitation coil 220 under each cell 150. When a given piece 120 is placed on a given cell 150, the electromagnetic flux emanating from coil 220 passes mostly through the coil 240 above the given cell 150 and there is substantially no electromagnetic flux through the other coils 220, even if they are situated on neighboring cells. This is because the magnitude of the electromagnetic field generated by coil 220, at a given location, is inversely proportional to the third power of the distance between the given location and coil 240 and, therefore, even a short distance between neighboring cells yields a significant difference between the respective electromagnetic fields. Thus, an electromagnetic signal in response to an excitation generated by a given coil 220 indicates that a piece 120 lies on the given cell 150. Further analysis of the sensed signal by processor 140 enables identification of the given piece 120 as described above.

In the embodiment described above, each piece 120 includes power source 260 which powers the circuitry in the piece, particularly transceiver circuit 250. Such an arrangement may be inconvenient, since each of pieces 120 requires periodic replacement of batteries and there may be a large number of pieces 120. Thus, according to an alternative embodiment of the present invention, a capacitor replaces transceiver circuit 250 and battery 260. The capacitor and coil 240 form a resonance circuit, such as the resonance circuit described in British Patent 2103943, incorporated herein by reference. According to this embodiment, the excitation (query) signal, which is preferably characterized by an abrupt change in electromagnetic flux, activates the resonance circuit which, thereby, resonates at its resonance frequency. Thus, the frequency of the answer signal is determined by the frequency of the resonance circuit.

Figure 12:
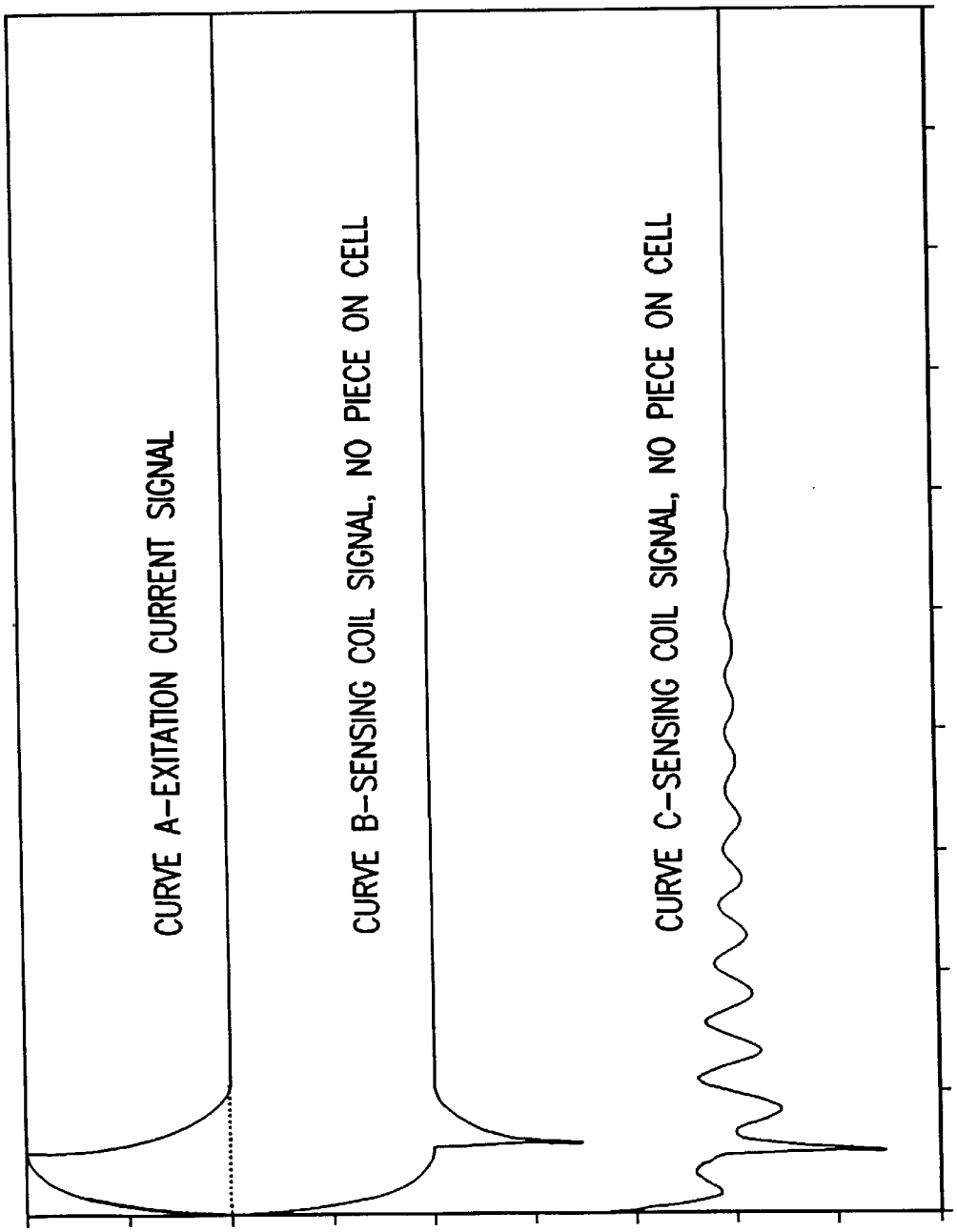
FIG. 12 is a schematic illustration showing graphs of the excitation and sensor signals used in a preferred embodiment of the present invention.

Reference is now briefly made to FIG. 12 which schematically illustrates typical signals which are used in the electronic game board system of the present invention. Curve "A" illustrates a typical excitation, query, signal generated by a given excitation coil 220. Curve "B" illustrates a typical sensor signal generated in the sensor coil when there is no piece 120 on the cell 150 above the given excitation coil. Curve "C" illustrates a typical sensor signal generated in the sensor coil when one of pieces 120 lies on the cell 150 above the given excitation coil.

It is appreciated that cells 150 can be sampled sequentially and the above mentioned identification methods can be sequentially applied. However, the scanning time required for such sequential sampling is expected to be very long when board 110 includes a large number of cells 150. To reduce the required scan time, the present inventor has found an improved method and apparatus for scanning game board 110 to determine the location and identity of pieces 120.

According to the present invention, cells 150 are sampled in groups, wherein all the cells in each group are sampled simultaneously, to reduce the time required for sampling and subsequent processing. In a preferred embodiment of the invention, as described in detail below and shown schematically in FIG. 11, upper portion 200 of game table 100 includes an array of excitation coils 220 which are interconnected through conductive rows and columns, such that each coil 220 is connected to a given row and a given column. In a preferred embodiment of the invention, all of the game pieces in a given row or column are excited together and the signals generated thereby in the sensor coil indicates the presence or absence of a piece in the given row or column. Each row and each column is sampled only once and, therefore, the sampling time is reduced by a factor substantially proportional to the square root of the number of cells 150. In this way the presence of a game piece in a given column and a given row are separately determined and the position of the piece, at the junction of the given row and given column is inferred.

However, since the signal measured by sampling a column or row is a superposition of a series of sensor signals generated by the series of sensors 220, respectively, further processing is used in order to isolate the different sensor signals. It should be appreciated that since the sensor signals are based on uniquely coded answer signals generated by pieces 120, the signals can be isolated by an appropriate processor or appropriate software in processing unit 140.

Alternatively, where the generated signals are indicative of the type of piece rather than of an individual piece, a slightly different procedure may be followed to determine the position of the individual pieces. At the beginning of the game, the presence of pieces in the individual cells is determined by interrogating the cells individually and not in groups. This gives the starting point for future determinations of the positions of the pieces. As the game progresses, for most games, only one or a few pieces change places at any one time and these changes generally take place in accordance with fixed rules. To determine which piece has moved, the excitation of the pieces takes place by rows and columns as previously described and any ambiguity in the position of identical pieces is overcome by knowledge of the previous position of the pieces and of the rules of the game. While this method does require a somewhat longer initial "set-up" time, the inquiries during play are very fast.

Figure 11:
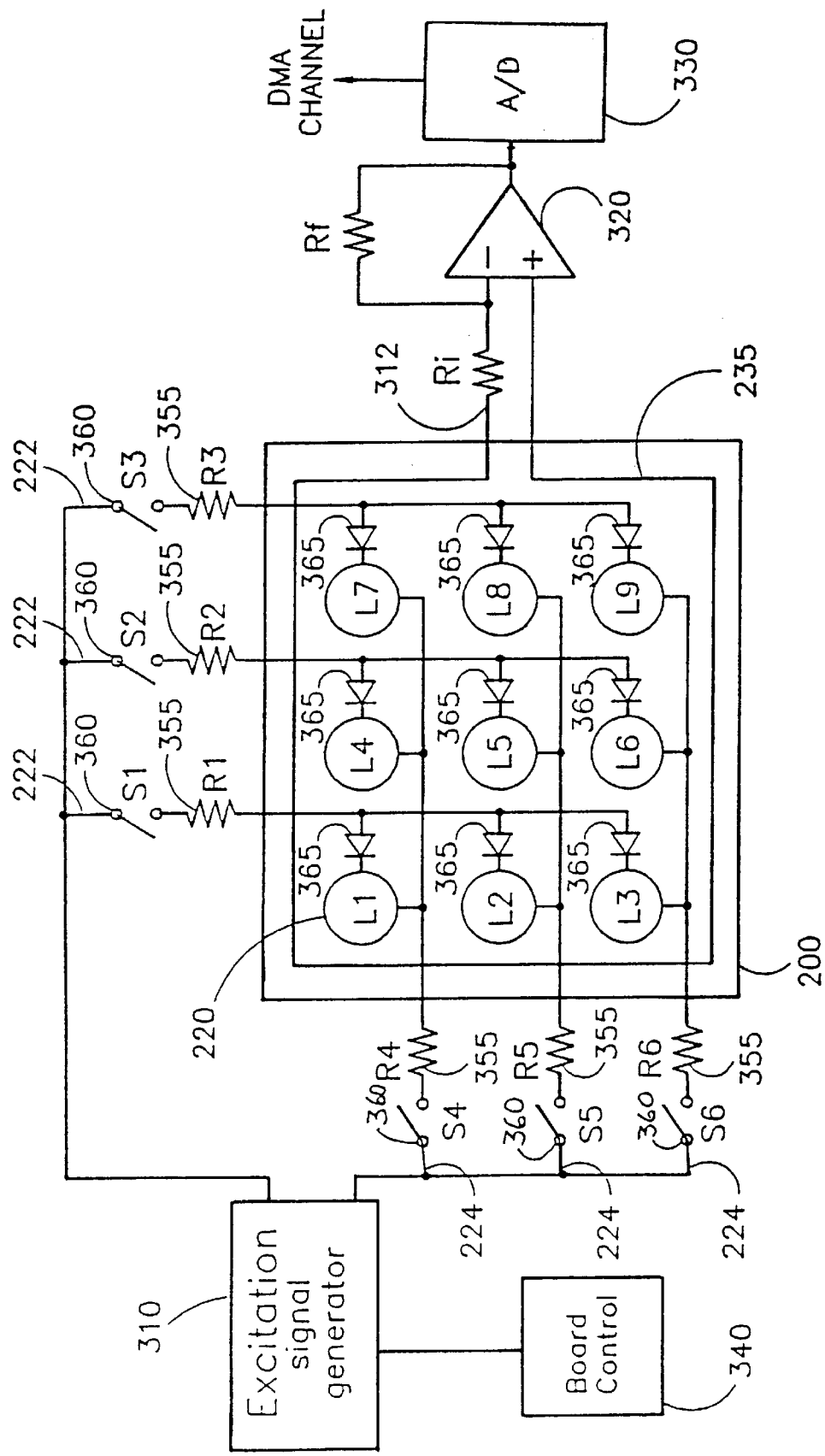
FIG. 11 is a schematic illustration of sensor-array circuitry useful for the operation of the game board system of FIG. 9, in accordance with one preferred embodiment of the present invention.

FIG. 11 schematically illustrates sensor-array circuitry useful for the operation of the game board system of FIG. 9, in accordance with one preferred embodiment of the present invention. A plurality of excitation coils 220, arranged as an array of coils, are mounted in upper part 200 of game table 100, preferably on a common plane. A peripheral sensing antenna 235, preferably a coil, is mounted in upper portion 200, preferably on the common plane of coils 220. Although antenna 235 is mounted along the rectangular periphery of portion 200, it will be appreciated that other antenna shapes and other mounting positions are possible. Coils 220 are preferably driven by an excitation signal generator 310 which drives electric current through selected ones of coils 220 via switches 360 and load resistors 355. Resistors 355 are included to avoid overloading of coils 220 which preferably have a very low Ohmic resistance.

The dimensions of excitation coils 220 and the separation between coils is determined by the size of cells 150 which depends, in turn, on requirements of the game. Excitation coils 220 are addressed via a conductor network including a plurality of rows 224 and a plurality of columns 222, whereby each coil 220 is connected to a given row and a given column. FIG. 11 shows a simplified network including three rows 224 and three columns 222. Rows 224 are connected, via respective resistors 355 and respective switches 360, to one of the terminals of excitation signal generator 310. Similarly, columns 222 are connected, via respective resistors 355 and respective switches 360, to the other terminal of signal generator 310.

This allows simultaneous connection of any row or column (or combination of rows or columns) of excitation coils 220 across signal generator 310, by appropriate activation of switches 360. Processing unit 140 (FIG. 9) controls the activation of switches 360, through a board control circuit 340, in accordance with a preselected activation pattern. Control circuit 340 preferably also controls the operation of signal generator 310 which drives excitation coils 220. For example, in the three row by three column array of FIG. 11, if switches S1 and S4 are closed while the remaining switches are open, coil L1 is connected while the other coils are not connected and, therefore, electromagnetic excitation is generated only from coil L1.

In a preferred embodiment of the invention, as shown in FIG. 11, the sensor-array circuitry further includes a diode 365 connected in series with each coil 220. The provision of diodes 365 prevents undesired flow of current via alternative paths, parallel to the addressed coils 220, since all such paths include at least two oppositely directed diodes 365. In the example described above, excitation current flows only through coil L1 while other, parallel, paths are blocked by diodes 365.

According to the present invention, a given coil 220 induces an excitation signal only in the antenna 240 of the piece 120 associated with the cell 150 over the given coil 220. Thus, a plurality of substantially isolated, local, excitation fields are induced by the plurality of coils 220.

In a preferred embodiment of the invention, switches 360 are activated sequentially, one row or one column at a time, such that each row 224 and each column 222 is sampled separately. For example, by closing switches S1, S4, S5 and S6 while leaving switches S2 and S3 open, sensor signals generated in response to excitation along the column 222 of coils L1, L2, L3 are measured after amplification by an amplifier 320. Similarly, by closing switches S1, S2, S3 and S4 while leaving switches S5 and S6 open, sensor signals generated in response to excitation along the row 224 of coils L1, L4, L7 are measured through amplifier 320.

The answer signals induce currents in sensor antenna 235 which generate corresponding sensor signals which are fed, preferably via a resistor 312, to an operational amplifier 320. The amplified sensor signals are preferably digitized by an analog-to-digital (A/D) converter 330 and, then, fed to processing unit 140, preferably via a DMA channel. The long rows 224 or columns 222, are analyzed by processing unit 140 to synthesize the individual codes modulated on the answer signals generated by pieces 120. The resistance of resistor 312 is determined based on common design considerations as required for operating operational amplifier 320 in a voltage summation mode.

In a preferred embodiment of the invention, as described above, answer signals of different pieces 120 or different types of pieces have different frequencies. According to this embodiment, a Discrete Fourier Transform (DFT) algorithm, which computes the frequency coefficients based on a least square fit, may be used for detecting and separating the sensor signal components corresponding to the various answer signals. The DFT process is preferably carried out by an appropriate circuit (or software) in processing unit 140. Utilizing the row and column information and, if necessary, knowledge of the previous position of the pieces and the rules of the game, unit 140 determines the position of all the pieces on the table.

The process is of determining the strengths of the signals, which is the first step in determining the position and orientation coordinates of the pieces implemented by taking into consideration that the received answer signals have the form:

$$m = \exp(-Qt)*(A_1 \cos \omega t + A_2 \sin \omega t)$$

where Q is a decay factor characteristic of the piece, ω is a resonant frequency characteristic of the piece and t is time. The factors $A_1$ and $A_2$ are not known a priori. Were they known, the signal strength "S" from the particular piece could be characterized as:

$$S = \{(A_1)^2 + (A_2)^2\}^{1/2}$$

A characteristic matrix V is now used to extract the information needed for determining $A_1$ and $A_2$ from N samples of the signal received from all of the pieces. If N samples are taken at times $t_n$ from $t_1$ to $t_N$ then V is a two column matrix having N elements in each column given by:

$$V_{n,1} = \exp(-Qt_n) \cos \omega t_n$$

$$V_{n,2} = \exp(-Qt_n) \sin \omega t_n$$

If the N samples of signal m are formed into an N element column vector M, and the values $A_1$ and $A_2$ are formed into a two element column vector A, then the values of $A_1$ and $A_2$ can be found by solving the equation:

$$V \times A = M$$

or $$A = V^{-1} \times M.$$

If K pieces are used in the game, V is a matrix having 2K columns and A is a column vector having 2K elements.

A value for N is chosen depending on the sampling rate and rate of decay of the signal. It has been found useful to sample at 164 kHz and set N=512. However, these values are not critical.

As indicated above, changes in the configuration of pieces 120 on board 110 are generally limited to events such as adding a new piece 120 to board 110, removing a piece 120 from the board, relocation of a piece 120 or any combination of such events. Since any of these possible changes in board configuration will generally affect, at most, the sensor signals of one or two rows 224 and one or two columns 222, such changes can be detected by comparing the row and column signals of a given board configuration with the row and column signals of a previous board configuration. Such comparison may be performed, for example, by a subtracter in processing unit 140. To enable access to previous board configurations, determined board configurations are preferably recorded and stored on a memory of processing unit 140, preferably a computer memory.

In a preferred embodiment of the invention, when changes are detected in the signals of given rows 224 and/or columns 222, only these signals are further analyzed to determine the identity and location of the pieces 120 which are involved in the changes. Using this procedure, the processing time required for determining game board configuration is reduced considerably.

When a given identifying answer frequency is used by more than one piece 120, for example when a given frequency identifies a type of piece 120, spectral analysis of each row and each column is insufficient for determining the configuration of pieces 120 on board 110. Thus, separate addressing of each of coils 220, by appropriate activation of switches 360, may be required, as described above, in order to determine an initial configuration, for example at the beginning of a game. However, it should be appreciated that once the initial configuration has been determined, subsequent configurations may be determined by analysis or comparison as described above, i.e. only on the cells where the changes in the signals, and therefore the changes in position of the pieces, have been detected. It should be appreciated that other detection procedures, such as exciting different groups of coils 220, may be used in conjunction with the sensor array circuitry of FIG. 11, in accordance with different game requirements.

In the preferred embodiments described above, the answer signals are preferably within the range of 1 KHz to 16 KHz. This frequency range matches the frequency range normally used by the sound processing board of existing computers, for example the Sound Blaster which is available from Creative Labs Inc., U.S.A. This frequency also avoids the noise caused by the horizontal sweep frequency of the display which is also preferably filtered out of the signals. To avoid interference by the vertical sweep of the display, the sampling is preferably synchronized with the vertical sweep and occurs between retraces.

A ferrite core is preferably provided in each of coils 240 of piece 120 to increase the inductance of the coils and thereby increase the signal magnitude.

To shorten the excitation time, the self inductance of coils 220 should be low. Furthermore, for efficient coupling between coils 220 and coils 240 of pieces 120, coils 220 and respective coils 240 should have a high mutual inductance. Therefore, both coils 240 and coils 220 are preferably flat coils. In a preferred embodiment of the invention, coils 220 are formed of several, interconnected, layers of a multi-layer printed circuit board, whereby each layer supports a spiral shaped conductor.

In the embodiment of FIG. 11, locations of pieces 120 on board 110 have discrete values, and the number of discrete locations on the board, i.e. the resolution of the board, is determined by the number of cells 150 and coils 220. It would be impractical to use such a cell-oriented system for simulating continuous location determination, since an extremely large number of cells would be required. An improved non-discrete measurement of locations is preferred for the games described herein (and for other games as well). A preferred method for non-discrete position and, optional, orientation measurement follows.

Figure 13A:
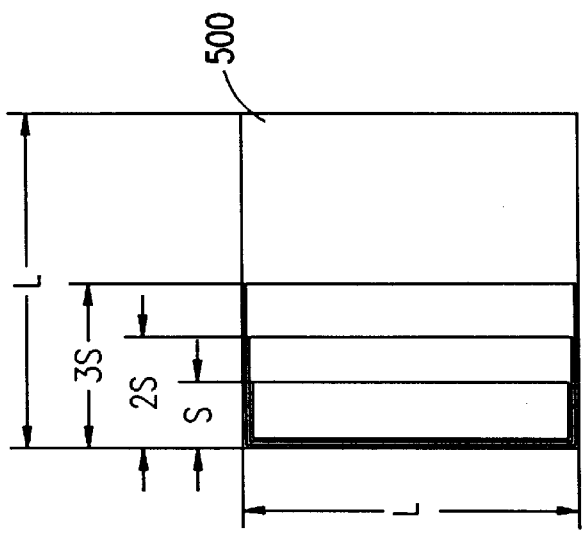
FIG. 13A is a schematic illustration of a sensor-array for continuous position determination useful for the game board system of FIGS. 1–9, in accordance with another preferred embodiment of the present invention.
Figure 13B:
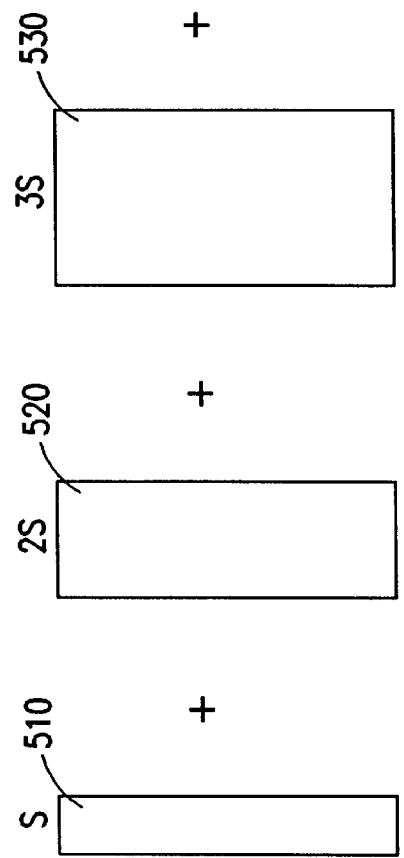
FIG. 13B is an exploded, explanatory, illustration showing the construction of the sensor-array of FIG. 13A.

Reference is now made to FIG. 13A which schematically illustrates left and right sensor coils, 500 and 550 respectively, of a sensor array suitable for continuous position determination, constructed in accordance with another preferred embodiment of the present invention, and to FIG. 13B which shows sub-coils of left sensor coil 500 separated for illustrative purposes. Left sensor coil 500 is preferably a rectangular coil, preferably a square coil of size L, including a plurality of rectangular sub-coils 510, 520, 530, etc., having a common length L but different widths. As shown in FIGS. 13A and 13B, the widths of sub-coils 510, 520, 530, etc., are S, 2S, 3S, etc., respectively, up to L which is the width of the widest sub-coil, labeled 540. The left sides of all the sub-coils of array 500 substantially overlap, while the right sides of consecutive sub-coils are separated by intervals of width S. The inventor has found that the size of the interval is not critical and that values of 1–2 cm give good results. This lack of criticality is especially true when the coils are spaced some distance from the coils in the game pieces.

Right sensor coil 550 is preferably a mirror image of left sensor coil 500. In right coil 550, the right sides of sub-coils 510, 520, 530, etc., substantially overlap while the left sides of consecutive sub-coils are separated by intervals of length S. In both coils, 500 and 550, interval length S is preferably smaller than the diameter of coils 240 in pieces 120. The number of loops in each sub-coil is preferably substantially the same.

Figure 14A:
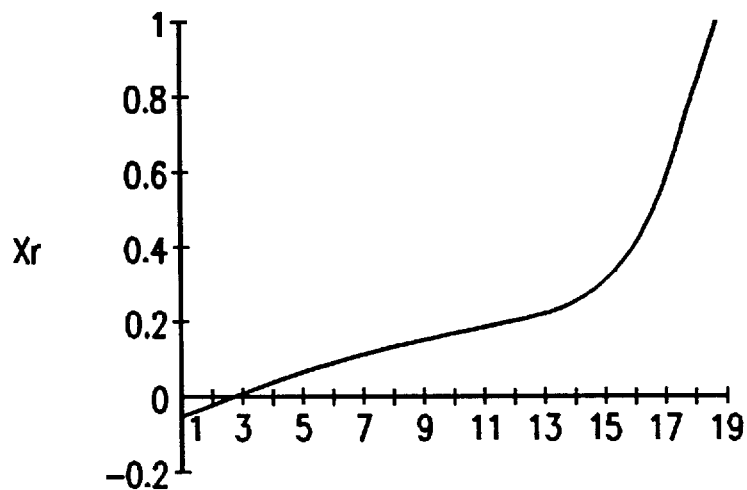
FIGS. 14A–14E are schematic graphs of sensor signals produced by the sensor array of FIG. 13A.
Figure 14B:
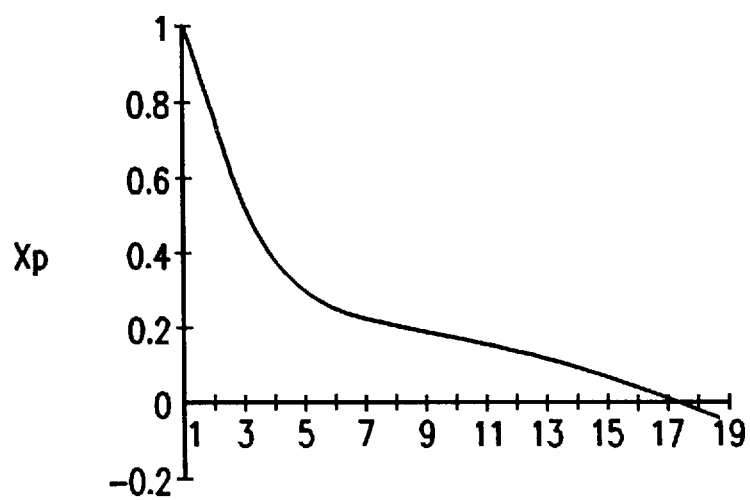

FIGS. 14A and 14B show the amplitude of sensor signals Xp and Xr, generated by coils 500 and 550, respectively, as a function of the position of a given piece 120 along the X-axis of board 110, wherein the position is measured from left to right. Coil 240 is assumed to be parallel to the surface of board 110 such that variations in the answer signal generated by coil 240 and the corresponding sensor signals are not due to tilting of the piece. However, since the exact position is generally not critical, position measurement accuracy is substantially preserved even when the piece is tilted. Position measurement is also not particularly sensitive to the distance of coil 240 from the sensor coils.

Figure 14C:
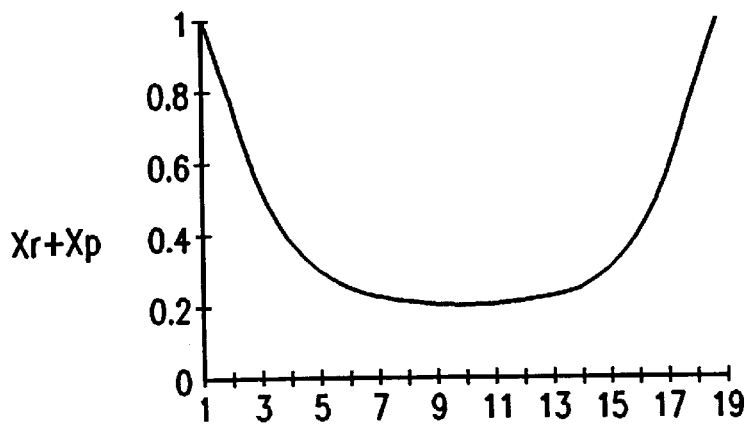
Figure 14D:
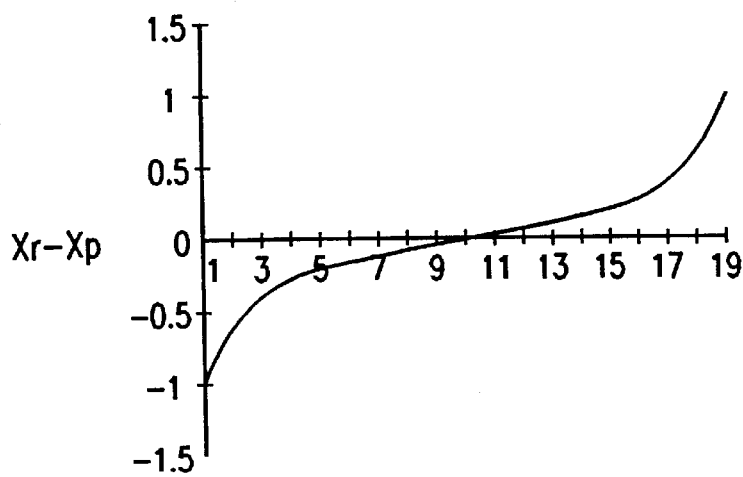
Figure 14E:
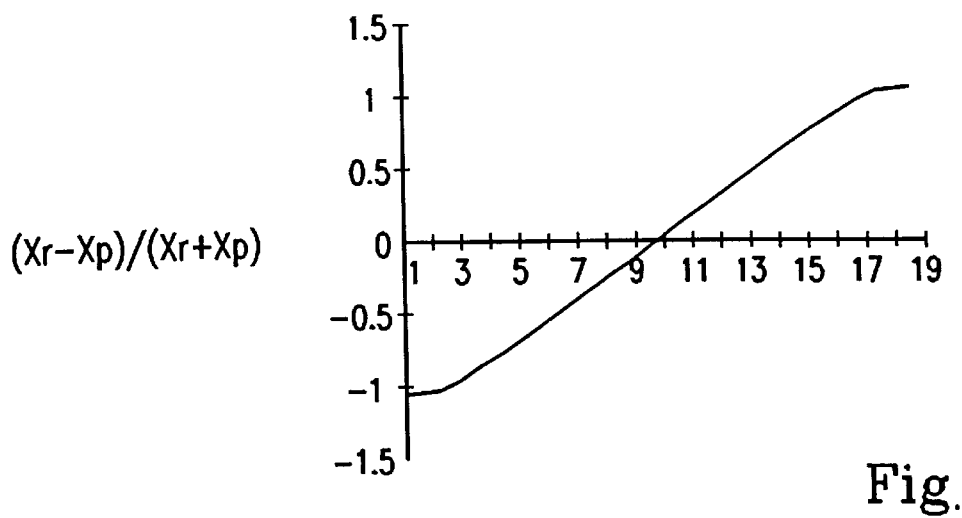

FIGS. 14C and 14D show the sum of the right and left sensor signals, Xr+Xp, and the difference between the right and left signals, Xr−Xp, respectively, as a function of the X-axis position. FIG. 14E shows the normalized difference between the two signals, (Xr−Xp)/(Xr+Xp), as a function of the X-axis position. It can be seen from FIG. 14E that the normalized difference between the signals is a monotonic, nearly linear function of the X-axis position of the given piece 120. Since (Xr−Xp)/(Xr+Xp) is normalized according to the sum Xr+Xp, the normalized signal is a pure position signal, independent of the actual values of sensor signals Xr and Xp. Thus, the X-axis position of the given piece 120 designated by "k" can be determined directly from the normalized position signal, by determining a signal spectrum of the sum of the two signal, S(Xr+Xp), and a signal spectrum of the difference between the signals, S(Xr−Xp). A normalized X-axis ordinate of piece 120, X', is then calculated as follows:

$$X'=S_k(Xr-Xp)/S_k(Xr+Xp), \qquad (1)$$

where $S_k$ is the component of the spectrum which is characteristic of the given piece "k". The sign of X' is the same as the sign of $\arctan((Xr-Xp)/(Xr+Xp))$.

In a preferred embodiment, the sensor array includes a second set of sensor coils, similar to coils 500 and 550, mounted substantially perpendicular to coils 500 and 550, i.e. with the varying dimension of groups 510, 520, etc., along the Y-axis. Using calculations as described above, a normalized Y-axis ordinate, Y', of the given piece 120 (n) is calculated as follows:

$$Y'=S_k(Yr-Yp)/S_k(Yr+Yp), \qquad (2)$$

where Yp and Yr are the voltages generated by the two coils in the second set of coils.

The actual position of the given piece 120 on board 110, (X,Y), which is a function of both coordinates X' and Y', is then determined from the following equations:

$$X=F_1(X',Y'); \qquad (3)$$

and $$Y=F_2(X',Y'), \qquad (4)$$

wherein $F_1$ and $F_2$ are transform functions between the (X',Y') ordinates and the actual location on board 110, which can be determined experimentally for a given design. Approximations of $F_1$ and $F_2$, for example polynomial approximations, can be determined using known methods, for example least-square-error approximations.

The phase of the sensor signals developed by the various sensor coils have also been found to depend on the position of the responding piece. In some embodiments of the invention, the position is measured using these phases, instead of the amplitudes. The amplitude and phase differences can be used together, for example in a system which makes a redundant calculation of position, to improve the accuracy of the position measurement.

The height of the piece may also be determined to a sufficient accuracy for game use, provided the signal strength is not substantially a function of X and Y. Under this condition, the strength of the field varies with the height of the piece from the sensor coils and the approximate height of a piece from the sensor coils is given by:

$$z = -8\log\{S_n(Xr+Xp)\} = -8\log\{S_n(Yr+Yp)\}. \quad (5)$$

Measurement of both the X sum and the Y sum can be used to improve accuracy.

Additionally, the azumith (rotation about the z axis), roll (projection onto the board of the rotation of the piece about a forward axis of the piece) and pitch (the projection onto the board or the rotation of the piece about an axis orthogonal to the azumith and roll axes). To achieve this goal two or three sensors are place in separate positions of a game figure. If two sensors are used, then two angles may be determined. If three properly placed, sensors are used, then all three angles may be determined.

For example, assume that a transponder (as defined above) is placed in each of legs 70 and 72 of a toy figure (such as that in FIG. 5). The azumith of the figure is given by:

$$Az = \arctan\{(Y_2-Y_1)/(X_2-X_1)\}, \quad (6)$$

where $X_i$, $Y_i$ are the coordinates of the two transponders.

The roll of the figure may be approximately computed by the semi-empirical formula:

$$\text{Roll} = \arctan\{0.1*(Z_2-Z_1)\}, \quad (7)$$

where $Z_i$ represents the height of the individual transponders.

If a third transponder is incorporated in a figure (for example, if three transponders are situated at reference points 74, 76 and 78 of toy FIG. 34 (FIG. 4A)) then the pitch may be calculated in a manner similar to the calculation of the roll.

The above discussion is based on the use of frequency as distinguishing between the different pieces, such that the signal spectrum values are used to identify signals which are characteristic of the different pieces. If other coding methods are used, the signals received from the various pieces are first separated by a method appropriate to the coding scheme used and the positions and orientation of the pieces is determined by equations 1–7 utilizing the amplitudes of the various characteristic signals.

Since the location (and orientation) of pieces 120 is fully determined by analyzing the sensor signals, this embodiment of the invention does not require a selective excitation arrangement, such as coils 220 and switches 360 in FIG. 11, for separately addressing different locations on board 110. Thus, a single, global, excitation antenna can be used for exciting coils 240 in all the pieces 120 on board 110. Such a global antenna may include a peripheral coil, similar to sensor antenna 235 of FIG. 11, driven by an excitation signal generator similar to signal generator 310 of FIG. 11. However, since the magnetic flux from such a peripheral coil decreases rapidly toward the center of board 110, and since the sensor signals are also weaker when the piece is nearer the center of the board, this embodiment of the invention may require wide dynamic range circuitry for processing the sensor signals, with the poorer signal to noise ratios, especially for signals near the center of the board. This problem can be avoided by generating a compensated excitation field, using an excitation coil designed particularly for that purpose, as described below. With such an excitation coil the sum of Xr and Xp is substantially constant, independent of the position of the responding piece on the game board.

Figure 15A:
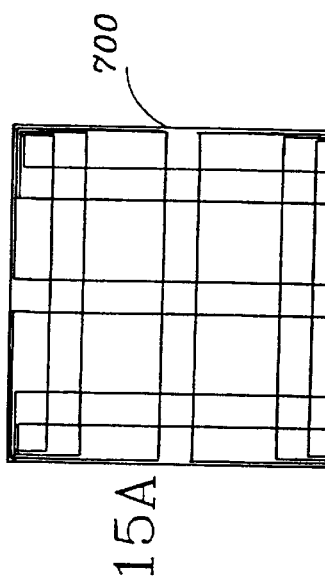
FIG. 15A is a schematic illustration of a preferred excitation coil for the embodiment of FIG. 13A.
Figure 15B:
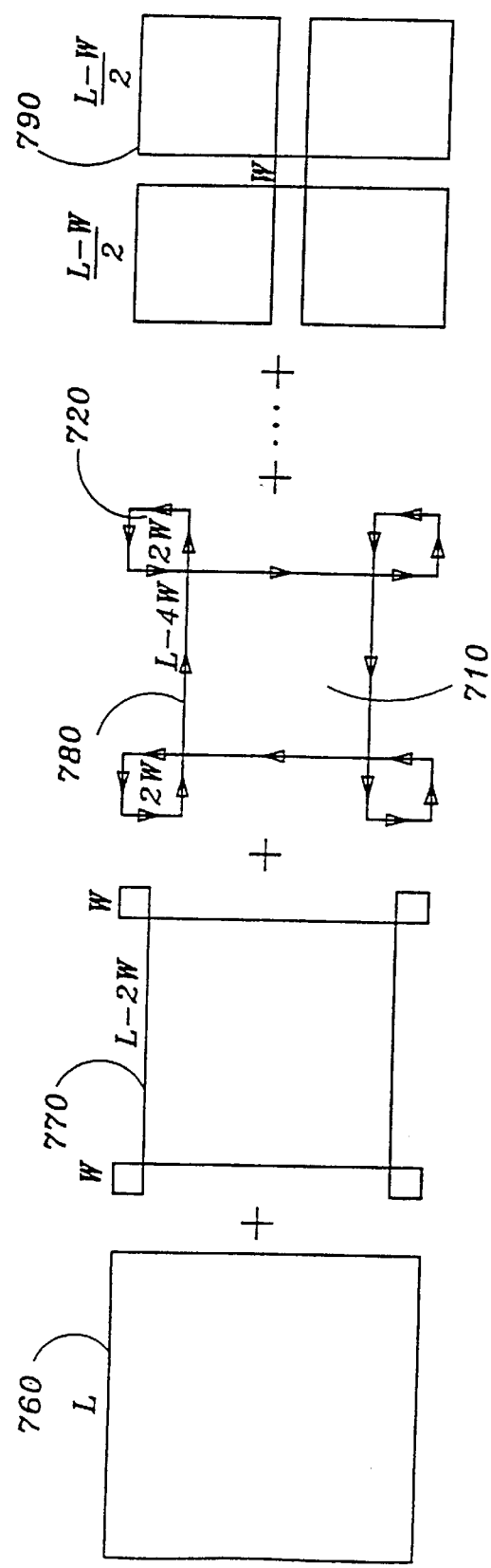
FIG. 15B is an exploded, explanatory, illustration showing the construction of the excitation coil of FIG. 15A.

FIG. 15A illustrates an excitation coil 700 particularly suitable for the preferred embodiment of FIGS. 13A and 13B, and to FIG. 15B which shows sub-coils of coil 700 separated for illustrative purposes. Coil 700 preferably includes a rectangular peripheral sub-coil 760, preferably a square having a side of length L, and a plurality of zoned sub-coils 770, 780 . . . 790. As shown schematically on sub-coil 780, each zoned sub-coil preferably includes five zones, namely, a center zone 710 in which current flow is in a first direction and four corner zones 720 in which current flow is in a second direction opposite the first direction. The sides of corner zones 720 of sub-coils 770, 780, etc., are of dimension W, 2W, etc., respectively, and the sides of center zones 710 of sub-coils 770, 780, etc., are L-2W, L-4W, etc., respectively. The corner zones of the last sub-coil, labeled 790, have a side length of (L-W)/2. The number of induction loops in the different sub-coils are selected such that the magnitude of the sensor signals corresponding to pieces 120 is substantially independent of their position on board 110.

For example, when L=19 and W=1, substantially homogeneous sensor signal amplitudes are obtained for the following number of loops: 100, 35, 31, 27, 22, 17, 13, 9, 6 and 2, starting from sub-coil 760 and going from left to right in FIG. 15B. This configuration provides an excitation field having a functionality approximately inverse to the curve of FIG. 14C. A greater or lesser number of sub-coils may be used, depending on the accuracy desired.

Figure 16:
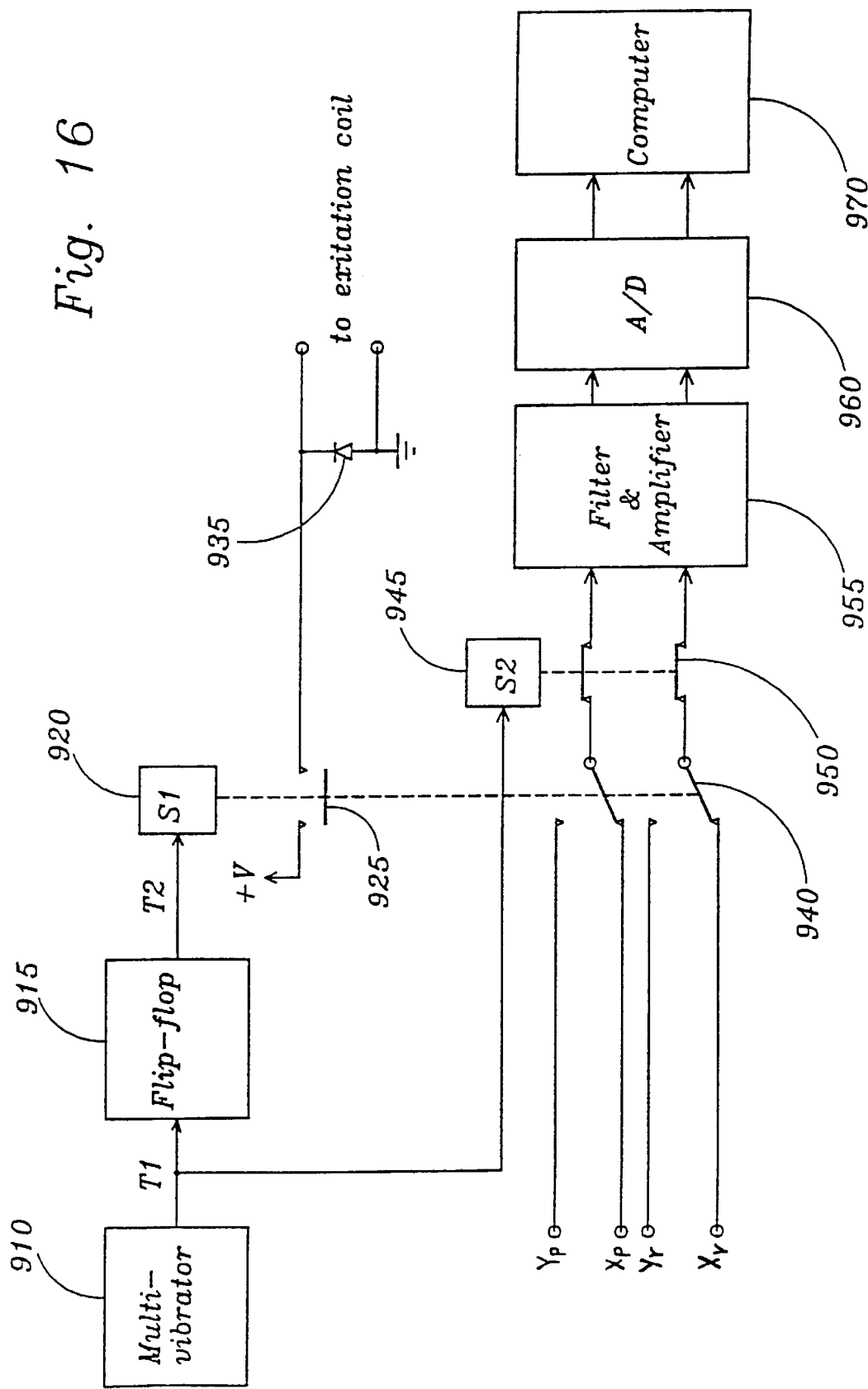
FIG. 16 is a schematic block-diagram of circuitry useful for operating the sensing table of FIG. 9.

Preferred circuitry for exciting and receiving signals from a game board according to FIGS. 13–15 is shown in FIG. 16. FIGS. 17A–17D schematically illustrate signals used by the circuitry of FIG. 16. The following paragraphs refer to FIGS. 16 and 17.

Figure 17A:
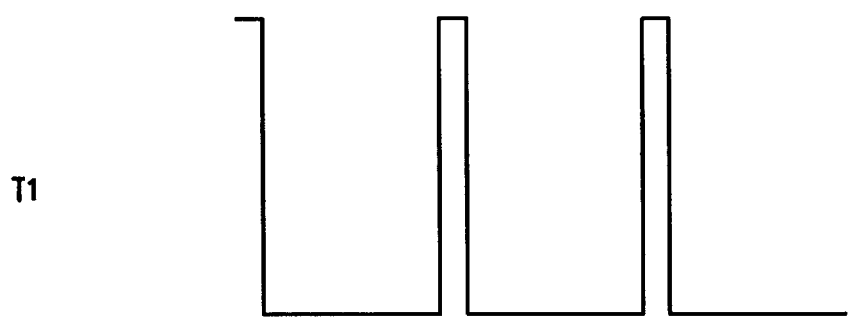
FIGS. 17A–17D are schematic graphs of signals generated by the game table and circuitry of FIG. 16.

A monostable multi-vibrator 910 generates a time signal T1, preferably having a duty cycle of approximately 1:3, which is fed to a flip-flop 915 (FIG. 17A). Multi-vibrator 910 is preferably triggered by the vertical sweep of display 4 (FIG. 1) to avoid vertical sweep interference. If the game board is not adjacent to display 4, then multivibrator 910 can be an astable multivibrator with a higher sampling rate.

Figure 17B:
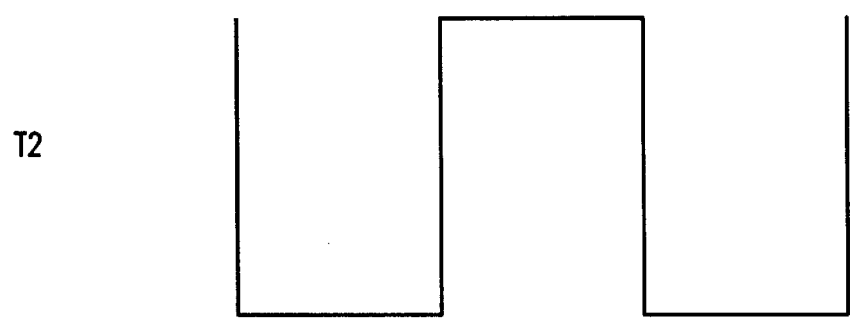
Figure 17C:
Figure 17D:

Flip-flop 915 converts signal T1 into a corresponding, alternating, signal T2, preferably having a duty cycle of 1:1, as shown in FIG. 17B. When alternating signal T2 is at its higher value, a switch 920 is activated to close a contact 925 and, thereby, to drive current through excitation coil 700. Additionally, when signal T2 is at the higher value, a selector 940 is switched to a first position in which sensor signals Xp and Xr from coils 500 and 550, respectively, are sampled. When signal T1 is at its higher value, a switch 945 is activated to open contacts 950 and, thereby, to temporarily prevent sampling of signals Xp and Xr. Sampling is prevented, during these intervals, to avoid the undesired effect of spikes generated by the sensor coils due to abrupt changes in the excitation current. The duty cycle of T1 is selected in accordance with the expected duration of such spikes. A typical sensor signal, with spikes, is shown in FIG. 17C.

When signal T2 is at its lower value, switch 920 opens contact 925 and remnants of the excitation signal are grounded through a diode 935. Additionally, when signal T2 is at the lower value, selector 940 is switched to a second position in which sensor signals Yp and Yr from Y coils corresponding to coils 500 and 550.

Signals Xp and Xr and signals Yp and Yr are received, alternatively, by an amplifier 955 which preferably includes an input filter, which, inter alia filters out interference from the horizontal sweep of display 4 and power line hum. A typical signal amplified by amplifier 955 is shown in FIG.

17D. The amplified signals are then converted by an analog to digital (A/D) converter to corresponding digital signals which are fed to a processor (computer) 970. Processor 970 calculates the signal spectrum of the sensor signals, as described above, for each period of signal T2. The presence of at least one piece 120 on board 110 is detected by detecting at least one, respective, peak in the calculated power spectrum. The identity of the at least one piece is determined, as described above, based on the frequency of the at least one, respective, peak. The (X,Y) position and optionally the z position and orientation of the at least one piece is determined, as described above, based on equations (3) and (4) for each frequency of the spectrum which corresponds to a game piece.

Processor 970 may be any processor known in the art which is capable of the above described calculations, for example a personal computer. A/D converter 960 may include a sound card such as Creative Sound-Blaster. If a sound card is used, the resonant circuits in pieces 120 are preferably tuned to frequencies below 15 kHz so that they are within the bandwidth of the sound card. However, the use of low resonant frequencies, which result in low sensor-signal frequencies, lowers the signal-to-noise (S/N) ratio of the system. Thus, the bandwidth for the resonant circuits must be carefully selected. These S/N ratio problems may also be reduced by utilizing a high frequency for excitation and then multiplying the sensor signals with a predetermined sinusoidal signal, after filtering the sensor signals through a low-pass filter, to obtain an IF signal having a frequency equal to the difference between the sensor signal frequency and the sinusoidal frequency. The sinusoidal signal is chosen such that the IF signals are within the bandwidth of the audio card to which the IF signal is fed. Repetative querying and averaging of signals is also useful for reducing noise.

According to another embodiment of the present invention, coils 500, 550, and the coresponding Y coils are used as excitation coils, while coil 700 is used as sensor coil. In this embodiment of the invention, each of coils 500, 550, 560 and 570 is excited separately. Due to reciprocity, equations 1–4 can be used to calculate the positions for this embodiment.

In accordance with a preferred embodiment of the present invention, devices which physically respond to given moves by the players are preferably mounted on or associated with game table 100. Such devices, which are preferably controlled by processing unit 140, may provide audible and/or visual and/or mechanical indications in response to given game board situations. Mechanical responses may include, for example, opening of a trap door or a gate, deliberately knocking down a given piece 120.

Figure 18A:
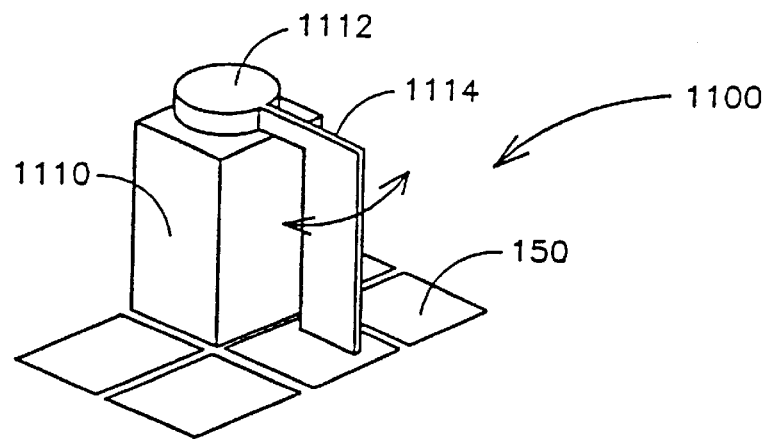
FIGS. 18A, 18B and 18C are schematic illustrations of three alternative, exemplary, devices for altering the environment of the game board system of FIG. 9.
Figure 18B:
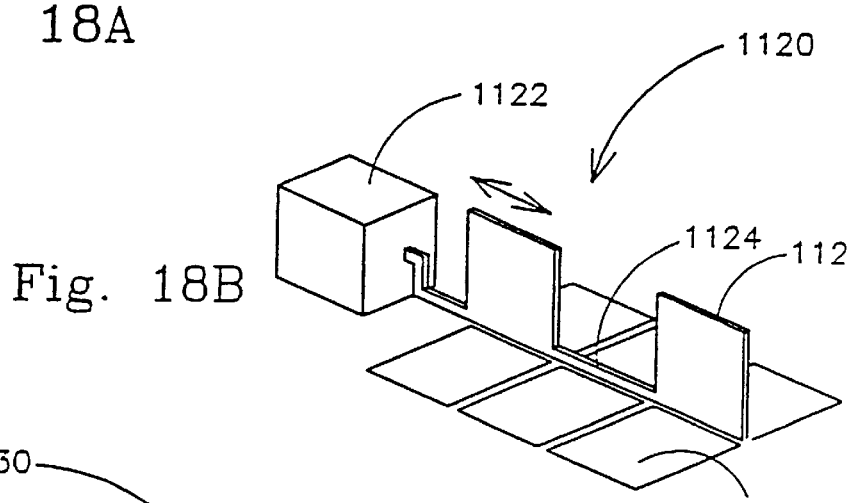
Figure 18C:
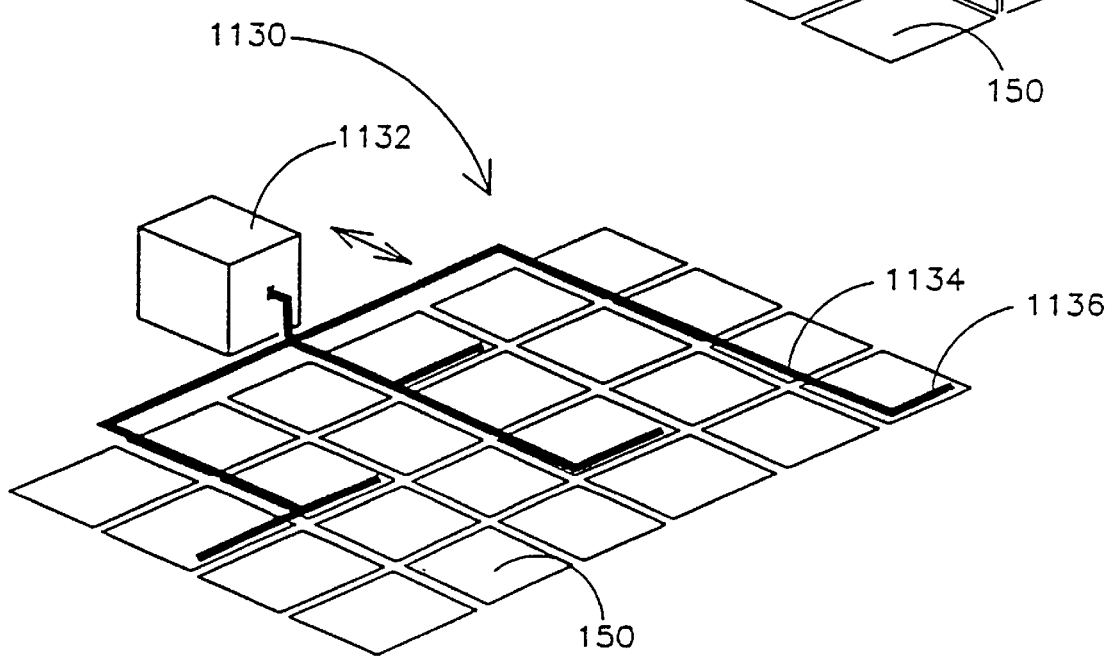

FIGS. 18A, 18B and 18C schematically illustrates three examples of devices for producing mechanical responses which may be associated with game table 100. FIG. 18A illustrates a gate device 1100 for blocking a given cell 150 from neighboring cells 150. Gate device 1100 includes a gate 1114 rotatably connected by a shaft 1112 to a housing 1110. An electronically controllable rotation mechanism, such as a step motor, for driving shaft 1112 is preferably mounted in housing 1110 and controlled by processing unit 140. Gate device 1100 may be connected to processing unit 140 via a connector in game table 100 or by wireless communication. Antenna 700 or coils 220, depending on the embodiment, may be used for transmitting command signals to a receiver in gate device 1100. Such command signals are preferably generated at a frequency different from the frequencies used for sensing and identifying pieces 120.

FIG. 18B illustrates a multi-gate device 1120 including a plurality of gates 1126 which are preferably connected by a rod 1124 to a housing 1122. Based on command signals which may be generated as described above, with reference to FIG. 18A, a solenoid actuator in housing 1122 moves rod 1124 into and out of housing 1122, thereby changing the positions of gates 1126 on board 110. By controlling the positions of gates 1126, the players are provided with a tangible indication of their available paths on board 110.

FIG. 18C illustrates a tumbling device 1130 including a housing 1132. A solenoid actuator in housing 1132 moves a plurality rods 1134 which, in turn, move a plurality of tumblers 1136 which are connected along rods 1134. When one of tumblers 1136 hits the bottom of a given pieces 120, the given piece loses its balance and falls down.

Figure 19:
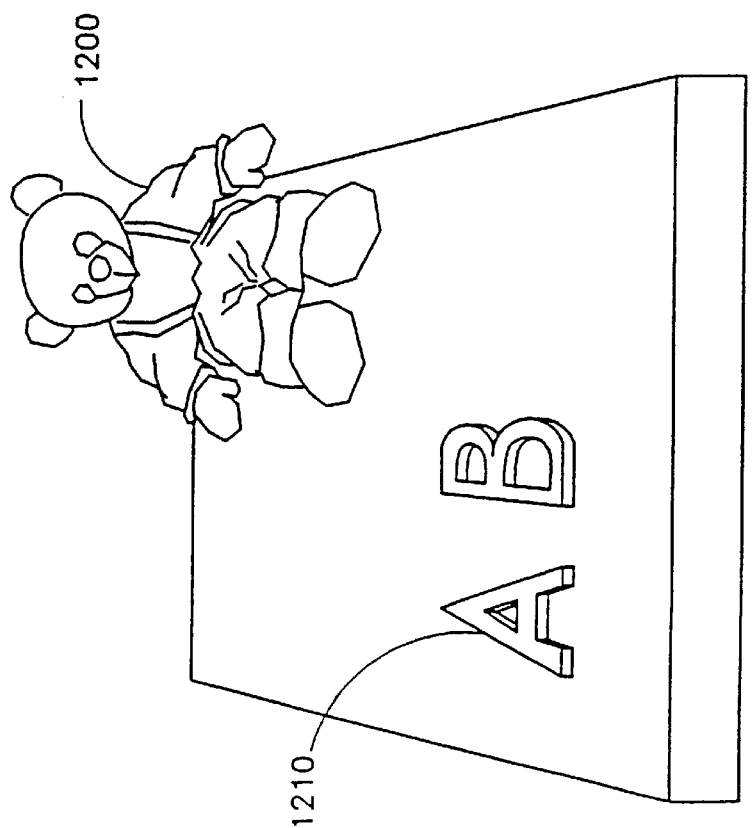
FIG. 19 is a simplified schematic illustration of an electronic educational device, constructed and operative in accordance with another aspect of the present invention.

FIG. 19 illustrates one example of a device for translating computer responses to tangible, preferably animated indications, adapted particularly for young children. The device of FIG. 19 includes a doll 1200 having built-in mechanisms for moving its limbs and head. The device may also include visible indicators, such as electric lamps, and audio indicators such as loudspeakers. Doll 1200 preferably responds with human-like gestures to the performance of the players along the game, such as, for example, the correct placement of one or more letters 1210. This and other similar devices are particularly useful as feedback devices for educational games.

Figure 20:
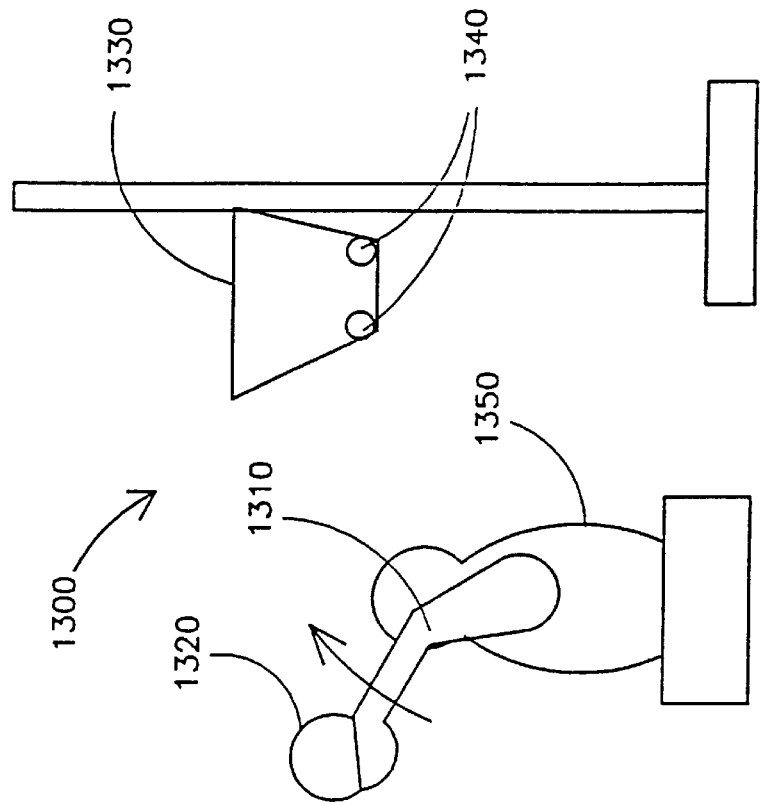
FIG. 20 is a simplified schematic illustration of an electronic playing device capable of sensing player's actions, constructed and operative in accordance with another aspect of the present invention.

FIG. 20 illustrates an example of another type of device 1300 which responds to game situations. The device of FIG. 20 senses the presence of a ball 1320 in a basket 1330 of a miniature basketball game, thereby detecting when a "basket" has been scored. Ball 1320 preferably has a metallic surface which activates a detection circuit by connecting electric contacts 1340 in basket 1330 when ball 1320 passes through basket 1330. Ball 1320 is preferably thrown by a mechanical arm 1310, which may be powered by a spring or by an electric motor, of a "basketball player" 1350. A counter in processing unit 140 may be used for counting the number of baskets scored.

It should be appreciated that all of the embodiments described above are mere examples and that other computer controlled mechanisms, for example vacuum pumps and valves, air fans and air pumps and valves, magnets and electromagnets, light sources, vibrating membranes, etc., may also be used in conjunction with the present invention.

In a preferred embodiment of the invention, game board surface 110 is printed on a non-conductive material, such as paper, cardboard or plastic. Three dimensional game boards may be constructed using a vacuum forming process on suitable materials. It is appreciated that three dimensional game boards have many advantages. For example, a player can hide his pieces from his opponents, more tangible scenery can, be constructed and game accessories can be concealed under the three dimensional surface topography. However, to ensure efficient and predictable coupling between pieces 120 and the sensors in game table 100 (FIG. 9), pieces 120 have coils 240 which are preferably all parallel to the surface of game table 100.

In an alternative embodiment of the present invention, game board surface 110 includes a layer of light transmissive material, such as the material used in flat displays, for example LCDs (Liquid Crystal Displays). Using such materials, it is possible to introduce on-board, computer controlled, visual communication with the players. According to this embodiment, the two dimensional designs on game board 110 are determined and, preferably, dynamically controlled by processing unit 140, for example by selectively changing the transmission of portions of the LCD.

In the embodiments described above processing unit 140 has been described as a separate unit, preferably a personal computer (PC). This embodiment is preferred since game table 100 can be designed as and add-on device to an existing computer, thereby reducing production costs. However, it should be noted that the present invention may also be embodied as an integrated device, wherein processing unit 140 is provided in the form of dedicated hardware in game table 100.

It should be appreciated that the present invention is not limited to single-plane game boards. A multi-planar arrangement may be formed using a plurality of game board surfaces, associated with a plurality of respective sensor arrays as described above, which are mounted at different levels of a multi-planer fixture or which utilize a single sensor array and determine Z of the pieces. Additionally or alternatively, vertical game board surfaces may be used and, in such a case, pieces 120 may be attached to the game board by means of appropriate vacuum or magnetic devices.

FIG. 21 schematically illustrates, as an example, a preferred board topography for a game which we call the "Game of Knights", incorporating devices and concepts of the present invention. The Game of Knights need not be a game of definite rules but, rather, it may provide an active environment in which pieces are moved according to arbitrary decisions by the players, preferably children between 2 and 9 years old.

The players add, remove or move playing pieces such as knights 1430, horses 1450 and canons 1460 on a board 1410 including a plurality of cells 1440. When a given piece is positioned on a given cell 1440, removed therefrom or moved to another cell 1440, these actions are sensed by a sensing array in the game board, as described above with reference to FIGS. 9–21, and a signal is communicated to a game control computer which activates various audio/visual options. Preferably, a different audio/visual indication is generated in conjunction with each type of event which occurs. The indication preferably depends on the identities of playing pieces involved in the event and on board conditions, such as the absolute and relative positions of the involved pieces on the board. Examples of some preferred game board responses are given below.

When a given knight 1430 is moved, a "footsteps" sound option is preferably activated. If a sword is attached to the given knight 1430, a different sound option may be activated when the knight moves. When the knight approaches a gate 1470 of a castle 1420, a "bell" sound option is preferably activated.

When a given piece lies on a given cell within a tumbling region controlled by a tumbler 1480 and stands there for a preselected time period, gate 1470 is opened and a suitable sound options are preferably activated. Tumbler 1480 may be activated randomly when a piece lies within the tumbling region, thereby adding a risk factor to be considered by a player before approaching gate 1470.

An "explosion" sound option may be provided whenever a button 1465 on canon 1460 is pushed. When a given knight 1430 is put on the back of horse 1450 and horse 1450 is moved, a "galloping" sound option is preferably activated. When two knights 1430, both armed with swords stand on neighboring cells 1440, a "sword battle" battle sound is preferably activated.

It will be appreciated by persons skilled in the art that the present invention is not limited to what has been thus far described. Rather, the scope of the present invention is limited only by the following claims:

I claim:
1. An electronic game board system comprising:
 a game board surface;
 an excitation signal generator which generates an electromagnetic query signal;
 a plurality of playing pieces positioned on the game board surface, each said piece including a transponder which receives the query signal and, in response thereto, generates an identifying answer signal; and
 a plurality of sensors which, upon receipt of the answer signal, generate a plurality of sensor signals responsive to the location of at least one playing piece for automatically and non-discretely sensing location of the playing pieces.

2. A system according to claim 1 and including:
 a processing unit which receives the sensor signals and which determines the identity of the at least one playing piece and the location of the playing piece on the game board surface based on the sensor signals.

3. An electronic game board system according to claim 2 wherein said playing pieces are selectably positionable by a player with respect to the game board surface and wherein said processing unit is operative to actuate an audio/visual display sequence in response to said determined location.

4. An electronic game board system according to claim 2 wherein said processing unit is operative to provide an output indication of motion of the playing pieces and to actuate an audio/visual display sequence in response thereto.

5. An electronic game board system according to claim 2 wherein said processing unit is operative to provide an output indication of direction of motion of the playing pieces and to actuate an audio/visual display sequence in response thereto.

6. An electronic game board system according to claim 2 wherein said processing unit is operative to provide an output indication of orientation of the playing pieces and to actuate an audio/visual display sequence in response thereto.

7. An electronic game board system according to claim 2 wherein said processing unit is operative in three dimensions.

8. An electronic game board system according to claim 7 and wherein at least some of said playing pieces have switches mounted thereon, whose operation is employed to actuate an audio/visual display sequence.

9. An electronic game board system according to claim 2 wherein said processing unit is operative in a wireless mode of operation.

10. An electronic game board system according to claim 9 and wherein said processing unit is operative in a wireless mode of operation which does not require an optical line of sight to the playing pieces.

11. An electronic game board system according to claim 9 and wherein at least some of said playing pieces have switches mounted thereon, whose operation is employed to actuate an audio/visual display sequence.

12. An electronic game board system according to claim 10 and wherein at least some of said playing pieces have switches mounted thereon, whose operation is employed to actuate an audio/visual display sequence.

13. An electronic game board system according to claim 2 and wherein at least some of said playing pieces have switches mounted thereon, whose operation is employed to actuate an audio/visual display sequence.

14. An electronic game board system according to claim 2 wherein at least one of said playing pieces is selectably positionable by a player in three dimensions and wherein said processing unit is operative to automatically and non-discretely sense the orientation of the playing piece and actuate an audio/visual display sequence in response thereto.

15. An electronic game board system according to claim 14 and wherein the orientation of said playing piece may include one or more of the following parameters:

(a) position (b) movement (c) direction (d) direction of movement.

16. An electronic game board system according to claim 14 and wherein said processing unit is operative to actuate an audio/visual display sequence also in response to one or more of the following parameters:

(a) position (b) movement (c) direction (d) direction of movement in the present and the past.

17. An electronic game board system according to claim 14 and wherein said processing unit is operative to differentiate between different types of movement.

18. An electronic game board system according to claim 17 and wherein said processing unit is operative to sense changes in orientation of a playing piece in more than two degrees of freedom.

19. An electronic game board system according to claim 18 where the processing unit is operative to sense changes in more than three degrees of freedom.

20. An electronic game board system according to claim 18 where the processing unit is operative to sense changes in more than four degrees of freedom.

21. An electronic game board system according to claim 18 wherein the processing unit is operative to sense changes in six degrees of freedom.

22. Apparatus according to claim 2 and wherein said processing unit is operative to provide a mechanical response.

23. A system according to claim 1 and also including apparatus for finding the height of movable object based on the strength of a sensor signal associated with the object.

24. A system according to claim 23 wherein the transponders of different pieces generate answer signals having different frequencies and wherein the processing unit isolates sensor signal components corresponding to different pieces by isolating the different frequencies.

25. A system according to claim 24 wherein the sensor signal components are isolated by a Discrete Fourier Transform in the processing unit.

26. An electronic game board system according to claim 1 wherein said plurality of sensors comprises a pair of sensor coils, the pair of coils generating a pair of sensor signals in response to a received answer signal.

27. An electronic game board system according to claim 26 wherein said plurality of sensors also comprises a second pair of sensor coils, the second pair of coils generating a second pair of sensor signals in response to a received answer signal.

28. An electronic game board system according to claim 1 and wherein said query signal and said answer signal are coded in according to at least one of frequency modulation, amplitude modulation, pulse modulation and time delay modulation.

29. Apparatus according to claim 1 and wherein said game board surface includes two dimensional designs which are dynamically controlled by a computer.

30. A position determining system comprising:

a board surface;

an excitation signal generator which generates an electromagnetic query signal;

at least one movable object positioned on the board surface, each object including a transponder which receives the query signal and, in response thereto, generates an identifying answer signal; and a pair of sensor coils, each coil including a plurality of sub-coils not all having the same width, the sub coils of one sensor coil being substantially aligned with a first edge of the board and the sub-coils of the other sensor coil being substantially aligned with an edge of the board opposite the first edge, the pair of coils generating a pair of sensor signals in response to a received answer signal.

31. A system according to claim 30 and including:

a second pair of sensor coils, each coil including a plurality of sub-coils not all having the same width, the sub coils of one sensor coil being substantially aligned with a second edge of the board not parallel to said first edge and the sub-coils of the other sensor coil being substantially aligned with an edge of the board opposite the second edge, the second pair of coils generating a second pair of sensor signals upon receipt of the answer signal and in response thereto.

32. A system according to claim 31 and including:

a processing unit which determines the coordinates of the position of the movable objects which produce answer signals in response to the first pair of sensor signals and the second pair of sensor signals.

33. A system according to claim 30 and including:

a processing unit which determines one coordinate of the position of the movable objects which produce answer signals in response to the sensor signals.

34. A system according to claim 30 wherein the excitation generator includes:

an excitation coil including a plurality of zoned sub-coils.

35. A system according to claim 34 and also including apparatus for finding the height of movable object based on the strength of a sensor signal associated with the object.

36. A system comprising:

a board surface;

at least one moveable object positioned on the board surface, said object including a transponder which receives an electromagnetic query signal and, in response thereto, generates an identifying answer signal; and an excitation signal generator which generates an electromagnetic query signal including an excitation coil comprising a plurality of zoned sub-coils, each zoned sub-coil including at least one zone bounded by a clockwise current loop produced by the excitation coil and at least one zone bounded by a counterclockwise current loop produced by the excitation coil.

37. A system according to claim 36 wherein the excitation coil underlies the board surface.

* * * * *

UNITED STATES PATENT AND TRADEMARK OFFICE

CERTIFICATE OF CORRECTION

PATENT NO. : 5,853,327
DATED : December 29, 1998
INVENTOR(S) : Pinhas GILBOA

It is certified that error appears in the above-identified patent and that said Letters Patent is hereby corrected as shown below:

On tiltle page, after "1996" of item 22, insert -- Related U.S. Application Data [63] Continuation of PCT/US95/10096 filed on July 25, 1995, abandoned. [30] Foreign Application Priority Data July 28, 1994 [IL] Israel 110,502 April 20, 1995 [IL] Israel 113,452 --.

Column 1, line 2, before "FIELD" insert -- This is a continuation of copending International application PCT/US95/10096 filed on July 25 1995, and which designated the U.S. --

Signed and Sealed this

Twenty-ninth Day of August, 2000

Attest:

Q. TODD DICKINSON

*Attesting Officer*  *Director of Patents and Trademarks*